(12) United States Patent
Della-Fera et al.

(10) Patent No.: US 10,738,711 B2
(45) Date of Patent: Aug. 11, 2020

(54) EROSION SUPPRESSION SYSTEM AND METHOD IN AN EXHAUST GAS RECIRCULATION GAS TURBINE SYSTEM

(71) Applicant: ExxonMobil Upstream Research Company, Houston, TX (US)

(72) Inventors: Gabriel Della-Fera, Greenville, SC (US); Todd F. Denman, Greenville, SC (US); Scott E. Ellis, Greenville, SC (US)

(73) Assignee: ExxonMobil Upstream Research Company, Spring, TX (US)

( * ) Notice: Subject to any disclaimer, the term of this patent is extended or adjusted under 35 U.S.C. 154(b) by 223 days.

(21) Appl. No.: 15/890,039

(22) Filed: Feb. 6, 2018

(65) Prior Publication Data

US 2018/0156136 A1    Jun. 7, 2018

Related U.S. Application Data

(62) Division of application No. 14/726,001, filed on May 29, 2015, now Pat. No. 9,885,290.

(Continued)

(51) Int. Cl.
*F02C 9/00* (2006.01)
*F02C 9/16* (2006.01)
(Continued)

(52) U.S. Cl.
CPC .............. *F02C 9/16* (2013.01); *F01D 17/08* (2013.01); *F02C 1/08* (2013.01); *F02C 3/34* (2013.01);
(Continued)

(58) Field of Classification Search
CPC .......... F05D 2270/311; F05D 2270/313; F05D 2270/44; F05D 2260/213; F01D 17/085; F02C 3/34; F02C 7/143; F02C 1/005
See application file for complete search history.

(56) References Cited

U.S. PATENT DOCUMENTS 2,488,911 A    11/1949    Hepburn et al.
2,884,758 A    5/1959    Oberle
(Continued)

FOREIGN PATENT DOCUMENTS

CA    2231749    9/1998
CA    2645450    9/2007
(Continued)

OTHER PUBLICATIONS

Japanese Provisional Report of the Office Action for JP Application No. 2016-576055 dated Apr. 11, 2019, 4 pps.
(Continued)

*Primary Examiner* — Todd E Manahan
*Assistant Examiner* — Katheryn A Malatek
(74) *Attorney, Agent, or Firm* — Fletcher Yoder, PC

(57) ABSTRACT

In an embodiment, a method includes flowing an exhaust gas from a turbine of a gas turbine system to an exhaust gas compressor of the gas turbine system via an exhaust recirculation path; evaluating moist flow parameters of the exhaust gas within an inlet section of the exhaust gas compressor using a controller comprising non-transitory media programmed with instructions and one or more processors configured to execute the instructions; and modulating cooling of the exhaust gas within the exhaust recirculation path, heating of the exhaust gas within the inlet section of the exhaust gas compressor, or both, based on the evaluation.

17 Claims, 8 Drawing Sheets

Related U.S. Application Data

(60) Provisional application No. 62/018,994, filed on Jun. 30, 2014.

(51) Int. Cl.

| | | |
|---|---|---|
| *F02C 3/34* | (2006.01) | |
| *F02C 6/00* | (2006.01) | |
| *F02C 7/141* | (2006.01) | |
| *F01D 17/08* | (2006.01) | |
| *F02C 1/08* | (2006.01) | |
| F02C 7/143 | (2006.01) | |
| F02C 1/00 | (2006.01) | |
| F01D 21/14 | (2006.01) | |

(52) U.S. Cl.
CPC .............. *F02C 6/003* (2013.01); *F02C 7/141* (2013.01); *F01D 17/085* (2013.01); *F01D 21/14* (2013.01); *F02C 1/005* (2013.01); *F02C 7/143* (2013.01); *F05D 2220/32* (2013.01); *F05D 2220/60* (2013.01); *F05D 2260/213* (2013.01); *F05D 2260/95* (2013.01); *F05D 2270/11* (2013.01); *F05D 2270/311* (2013.01); *F05D 2270/313* (2013.01); *F05D 2270/44* (2013.01); *F05D 2270/71* (2013.01); *Y02E 20/16* (2013.01); *Y02T 50/676* (2013.01)

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis et al. |
| 3,949,548 A | 4/1976 | Lockwood |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kicker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |

(56) References Cited

U.S. PATENT DOCUMENTS

| | | |
|---|---|---|
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Asen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Asen et al. |
| 6,301,888 B1 | 10/2001 | Gray |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Asen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Asen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |

(56) References Cited

U.S. PATENT DOCUMENTS

| | | |
|---|---|---|
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakia et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |

(56) References Cited

U.S. PATENT DOCUMENTS

| | | |
|---|---|---|
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 9,752,458 B2 | 9/2017 | Huntington et al. |
| 9,863,267 B2 | 1/2018 | O'Dea et al. |
| 2001/0000049 A1 | 3/2001 | Kataoka et al. |
| 2001/0029732 A1 | 10/2001 | Bachmann |
| 2001/0045090 A1 | 11/2001 | Gray |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0154717 A1 | 8/2003 | Schmid et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |

(56) References Cited

U.S. PATENT DOCUMENTS

| | | |
|---|---|---|
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126181 A1* | 5/2010 | Ranasinghe ............... F02C 1/08 60/782 |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0047576 A1 | 2/2013 | Sander et al. |
| 2013/0061597 A1* | 3/2013 | Chillar .................. F02C 7/04 60/775 |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0096503 A1* | 4/2014 | Ribarov .................. H05B 6/109 60/39.093 |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |
| 2014/0150445 A1 | 6/2014 | Huntington et al. |
| 2014/0182298 A1 | 7/2014 | Krull et al. |
| 2014/0182299 A1 | 7/2014 | Woodall et al. |
| 2014/0182301 A1 | 7/2014 | Angelyn et al. |
| 2014/0182302 A1 | 7/2014 | Angelyn et al. |
| 2014/0182303 A1 | 7/2014 | Angelyn et al. |
| 2014/0182304 A1 | 7/2014 | Angelyn et al. |
| 2014/0182305 A1 | 7/2014 | Angelyn et al. |
| 2014/0196464 A1 | 7/2014 | Biyani et al. |
| 2014/0216011 A1 | 8/2014 | Muthaiah et al. |
| 2015/0000292 A1 | 1/2015 | Subramaniyan |
| 2015/0000293 A1 | 1/2015 | Thatcher et al. |
| 2015/0000294 A1 | 1/2015 | Minto et al. |
| 2015/0000299 A1 | 1/2015 | Zuo et al. |
| 2015/0033748 A1 | 2/2015 | Vaezi |
| 2015/0033749 A1 | 2/2015 | Slobodyanskiy et al. |
| 2015/0033751 A1 | 2/2015 | Andrew |
| 2015/0033757 A1 | 2/2015 | White et al. |
| 2015/0040574 A1 | 2/2015 | Wichmann et al. |
| 2015/0059350 A1 | 3/2015 | Kolvick et al. |
| 2015/0075171 A1 | 3/2015 | Sokolov et al. |
| 2015/0152791 A1 | 6/2015 | White |
| 2015/0198089 A1 | 7/2015 | Muthaiah et al. |
| 2015/0204239 A1 | 7/2015 | Minto et al. |
| 2015/0214879 A1 | 7/2015 | Huntington et al. |
| 2015/0226133 A1 | 8/2015 | Minto et al. |
| 2015/0330252 A1 | 11/2015 | Manchikanti et al. |
| 2015/0377140 A1 | 12/2015 | Minto et al. |
| 2015/0377148 A1 | 12/2015 | Minto et al. |
| 2016/0010547 A1 | 1/2016 | Valeev et al. |

FOREIGN PATENT DOCUMENTS

| | | |
|---|---|---|
| CN | 101737205 A | 6/2010 |
| CN | 102900530 A | 1/2013 |
| CN | 102996250 A | 3/2013 |
| DE | 102004012080 A1 | 10/2005 |

(56) References Cited

FOREIGN PATENT DOCUMENTS

| | | |
|---|---|---|
| EP | 0770771 | 5/1997 |
| GB | 0776269 | 6/1957 |
| GB | 2117053 | 10/1983 |
| JP | H11510578 A | 9/1999 |
| WO | WO1999006674 | 2/1999 |
| WO | WO1999063210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | WO2013147632 | 10/2013 |
| WO | WO2013147633 | 10/2013 |
| WO | WO2013155214 | 10/2013 |
| WO | WO2013163045 | 10/2013 |
| WO | WO2014071118 | 5/2014 |
| WO | WO2014071215 | 5/2014 |
| WO | WO2014133406 | 9/2014 |

OTHER PUBLICATIONS

PCT International Search Report & Written Opinion for Application No. PCT/US2015/038359 dated Oct. 22, 2015.

Chinese Office Action for CN Application No. 201580045110.2 dated Mar. 2, 2018; 5 Pages.

Ahmed, S. et al. (1998) "Catalytic Partial Oxidation Reforming of Hydrocarbon Fuels," 1998 Fuel Cell Seminar, 7 pgs.

Air Products and Chemicals, Inc. (2008) "Air Separation Technology—Ion Transport Membrane (ITM)," www.airproducts.com/ASUsales, 3 pgs.

Air Products and Chemicals, Inc. (2011) "Air Separation Technology Ion Transport Membrane (ITM)," www.airproducts.com/gasification, 4 pgs.

Anderson, R. E. (2006) "Durability and Reliability Demonstration of a Near-Zero-Emission Gas-Fired Power Plant," California Energy Comm., CEC 500-2006-074, 80 pgs.

Baxter, E. et al. (2003) "Fabricate and Test an Advanced Non-Polluting Turbine Drive Gas Generator," U. S. Dept. Of Energy, Nat'l Energy Tech. Lab., DE-FC26-00NT 40804, 51 pgs.

Bolland, O. et al., (1998) "Removal of CO2 From Gas Turbine Power Plants Evaluation of Pre-and Postcombustion Methods," SINTEF Group, www.energy.sintef.no/publ/xergi/98/3/art-8engelsk.htm, 11 pgs.

BP Press Release (2006) "BP and Edison Mission Group Plan Major Hydrogen Power Project for California," www.bp.com/hydrogenpower, 2 pgs.

Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.

Clark, Hal (2002) "Development of a Unique Gas Generator for a Non-Polluting Power Plant," California Energy Commission Feasibility Analysis, P500-02-011F, 42 pgs.

Foy, Kirsten et al. (2005) "Comparison of Ion Transport Membranes" Fourth Annual.Conference on Carbon Capture and Sequestration, DOE/NETL; 11 pgs.

Cho, J. H. et al. (2005) "Marrying LNG and Power Generation," Energy Markets; 10, 8; ABI/INFORM Trade & Industry, 5 pgs.

Ciulia, Vincent. (2001-2003) "Auto Repair. How the Engine Works," http://autorepair.about.com/cs/generalinfo/a/aa060500a.htm, 1 page.

Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.

Science Clarified (2012) "Cryogenics," http://www.scienceclarified.com/Co-Di/Cryogenics.html; 6 pgs.

Defrate, L. A. et al. (1959) "Optimum Design of Ejector Using Digital Computers" Chem. Eng. Prog. Symp. Ser., 55 ( 21), 12 pgs.

Ditaranto, M. et al. (2006) "Combustion Instabilities in Sudden Expansion Oxy-Fuel Flames," ScienceDirect, Combustion and Flame, v.146, 20 pgs.

Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.podf, 15 pgs.

Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.

Ertesvag, I. S. et al. (2005) "Exergy Analysis of a Gas-Turbine Combined-Cycle Power Plant With Precombustion $CO_2$ Capture," Elsevier, 35 pgs.

Elkady, Ahmed. M. et al. (2009) "Application of Exhaust Gas Recirculation in a DLN F-Class Combustion System for Postcombustion Carbon Capture," ASME J. Engineering for Gas Turbines and Power, vol. 131, 6 pgs.

Evulet, Andrei T. et al. (2009) "On the Performance and Operability of GE's Dry Low $NO_x$ Combustors utilizing Exhaust Gas Recirculation for Post-Combustion Carbon Capture" Energy.Procedia I, 8 pgs.

Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf , 22 pgs.

Luby, P. et al. (2003) "Zero Carbon Power Generation: IGCC as the Premium Option," Powergen International, 19 pgs.

Macadam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.

Morehead, H. (2007) "Siemens Global Gasification and IGCC Update," Siemens, Coal-Gen, 17 pgs.

Nanda, R. et al. (2007) "Utilizing Air Based Technologies as Heat Source for LNG Vaporization," presented at the $86^{th}$ Annual convention of the Gas Processors of America (GPA 2007), , San Antonio, TX; 13 pgs.

Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.

Reeves, S. R. (2003) "Enhanced Coalbed Methane Recovery," Society of Petroleum Engineers 101466-DL; SPE Distinguished Lecture Series, 8 pgs.

Richards, Geo A., et al. (2001) "Advanced Steam Generators," National Energy Technology Lab., Pittsburgh, PA, and Morgantown, WV; NASA Glenn Research Center (US), 7 pgs.

Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.

Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.

Van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.

Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.

* cited by examiner

EROSION SUPPRESSION SYSTEM AND METHOD IN AN EXHAUST GAS RECIRCULATION GAS TURBINE SYSTEM

CROSS-REFERENCE TO RELATED APPLICATION

This application is a divisional of U.S. patent application Ser. No. 14/726,001, entitled "EROSION SUPPRESSION SYSTEM AND METHOD IN AN EXHAUST GAS RECIRCULATION GAS TURBINE SYSTEM", filed on May 29, 2015, which claims priority from and the benefit of U.S. Provisional Patent Application No. 62/018,994, entitled "EROSION SUPPRESSION SYSTEM AND METHOD IN AN EXHUAST GAS RECIRCULATION GAS TURBINE SYSTEM", filed on Jun. 30, 2014. Each of the above-referenced applications is hereby incorporated by reference in its entirety for all purposes.

BACKGROUND

The subject matter disclosed herein relates to gas turbine engines.

Gas turbine engines are used in a wide variety of applications, such as power generation, aircraft, and various machinery. Gas turbine engines generally combust a fuel with an oxidant (e.g., air) in a combustor section to generate hot combustion products, which then drive one or more turbine stages of a turbine section. The turbine stages, when driven by the hot combustion products, create torque to drive a shaft. The rotating shaft, in turn, drives one or more compressor stages of a compressor section, and can also drive an electrical generator to produce electrical energy.

Compressor sections can include, as an example, wheels attached to the rotatable shaft of the gas turbine system. The wheels may be attached to airfoils that, when rotated with the wheels, act upon and compress a working fluid. These airfoils may be subjected to various mechanical and environmental stresses, such as the pressure and heat generated from compression of the working fluid, as well as water condensation that occurs during the compression. The operating life of the airfoils may at least partially depend on their ability to withstand these mechanical and environmental stresses.

BRIEF DESCRIPTION

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

In one embodiment, a gas turbine system includes an exhaust gas compressor, comprising: an inlet section fluidly coupled to a turbine expander via an exhaust gas recirculation path; a detection system comprising at least one non-intrusive measurement device coupled to the inlet section, wherein the at least one non-intrusive measurement device is configured to generate a first feedback relating to moisture contained within an exhaust gas flowing through the inlet section; and a controller communicatively coupled to the detection system and comprising non-transitory media programmed with one or more sets of instructions, and one or more processing devices configured to execute the one or more sets of instructions such that the controller is configured to: evaluate the first feedback for one or more indications of condensation of the moisture within the exhaust gas as the exhaust gas flows through the exhaust gas compressor; and provide a user-perceivable indication for a first corrective action to be taken if the one or more indications are indicative of moisture condensation outside of a first predetermined condensation range; or perform a second corrective action if the one or more indications are indicative of moisture condensation outside of a second predetermined condensation range.

In another embodiment, a method includes flowing an exhaust gas from a turbine of a gas turbine system to an exhaust gas compressor of the gas turbine system via an exhaust recirculation path; evaluating moist flow parameters of the exhaust gas within an inlet section of the exhaust gas compressor using a controller comprising non-transitory media programmed with instructions and one or more processors configured to execute the instructions; and modulating cooling of the exhaust gas within the exhaust recirculation path, heating of the exhaust gas within the inlet section of the exhaust gas compressor, or both, based on the evaluation.

In another embodiment, a gas turbine system includes an exhaust recirculation path extending from a turbine outlet to an exhaust gas compressor; an exhaust gas cooling system positioned along the exhaust recirculation path and configured to cool exhaust gas within the exhaust recirculation path; a water droplet size and flux measurement system positioned downstream of the exhaust gas cooling system and upstream of inlet guide vanes of the exhaust gas compressor, wherein the water droplet size and flux measurement system is configured to measure a droplet size and density of water within the exhaust gas; and a direct contact heating system positioned between the exhaust gas cooling system and the water droplet size and flux measurement system, wherein the direct contact heating system is configured to heat the exhaust gas; a controller communicatively coupled to the water droplet size and flux measurement system, the exhaust gas cooling system, and the direct contact heating system, wherein the controller comprises non-transitory media programmed with instructions that are executable by a processor of the controller such that the controller is configured to monitor the droplet size and density of water within the exhaust gas, and modulate cooling of the exhaust gas by the exhaust gas cooling system, modulate heating of the exhaust gas by the direct contact heating system, or both, based at least partially on the monitored droplet size and density of water within the exhaust gas.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
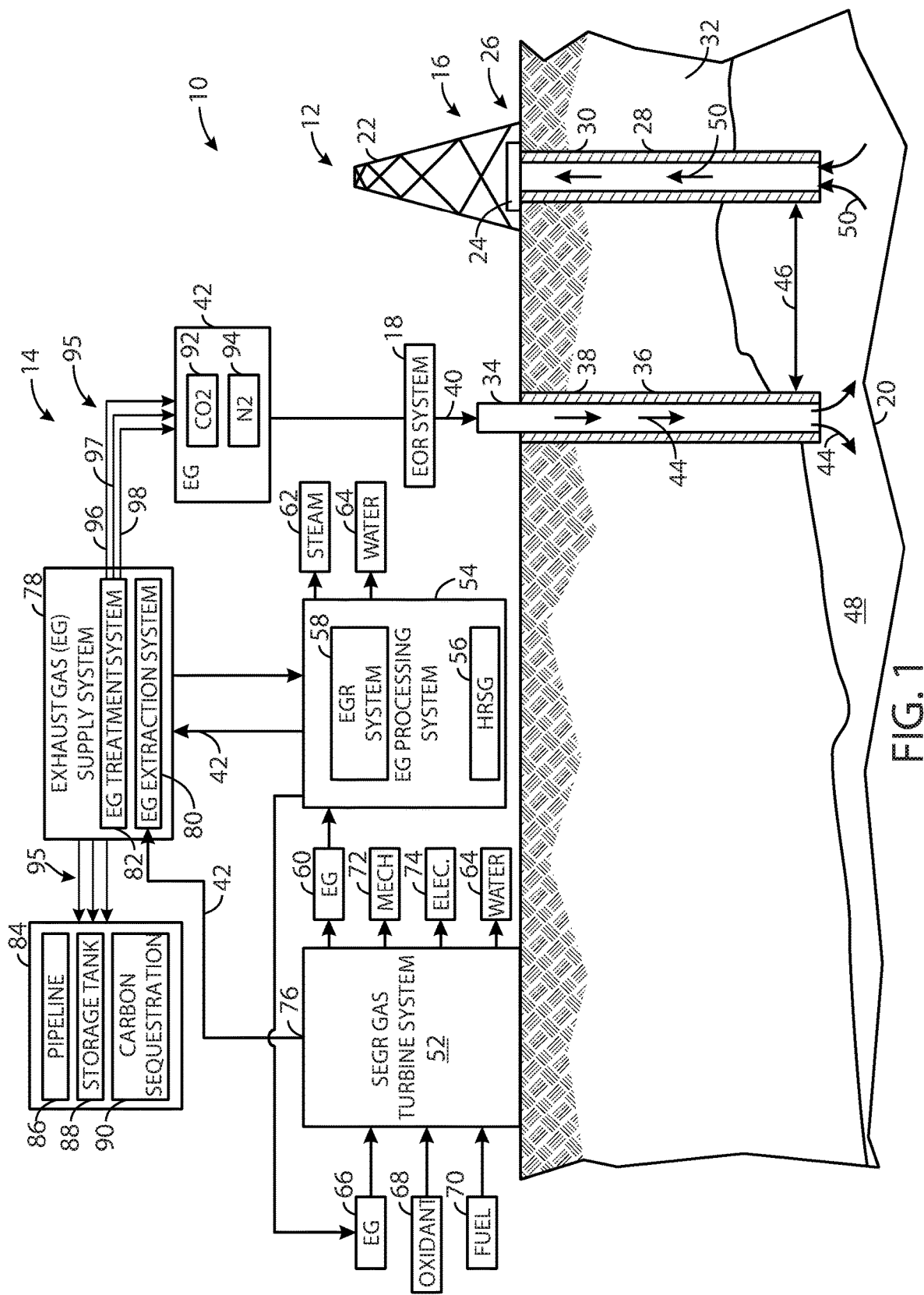
FIG. 1 is a diagram of an embodiment of a system having a turbine-based service system coupled to a hydrocarbon production system.

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper," "lower," "left," "right," "front," "rear," "top," "bottom," "horizontal," "vertical," "upstream," "downstream," "fore," "aft," and the like; merely describe the configuration shown in the FIGS. Indeed, the element or elements of an embodiment of the present invention may be oriented in any direction and the terminology, therefore, should be understood as encompassing such variations unless specified otherwise.

As discussed in detail below, the disclosed embodiments relate generally to gas turbine systems with exhaust gas recirculation (EGR), and particularly operation of the gas turbine systems using EGR such that the systems have low emissions. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. In addition to controlling the flow of the fuel and/or oxidant, the recirculation of the exhaust gas along with stoichiometric combustion may help to increase the concentration level of $CO_2$ in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units).

The disclosed embodiments also relate to the control of moisture within a recirculated exhaust gas by balancing heating and cooling of the exhaust gas to effect condensing conditions. The control systems and schemes described below with respect to FIGS. 5-8 may, for example, use one or more detected parameters relating to moisture within a recirculated exhaust gas in order to suppress the dewpoint of the exhaust gas. As an example, the exhaust gas may be cooled in order to reduce the specific humidity of the exhaust gas, and, subsequently, the exhaust gas may be heated in order to decrease the relative humidity of the exhaust gas, thereby mitigating moisture condensation. In controlling moisture condensation, the systems and methods described below may enable continued operation of compressor components that might otherwise be deleteriously effected by interactions with water droplets.

FIG. 1 is a diagram of an embodiment of a system 10 having an hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi (Φ), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
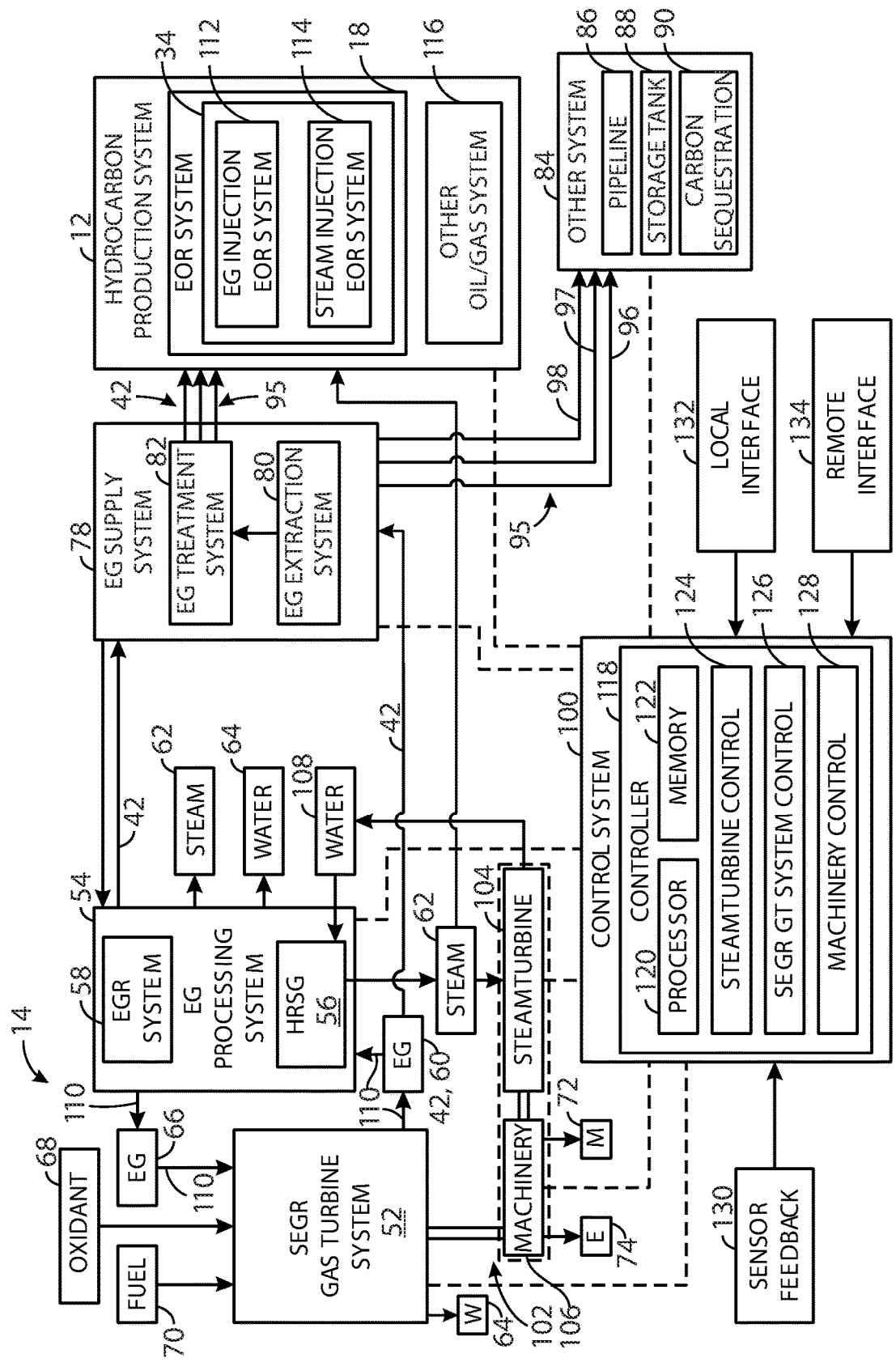
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_X$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_X$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
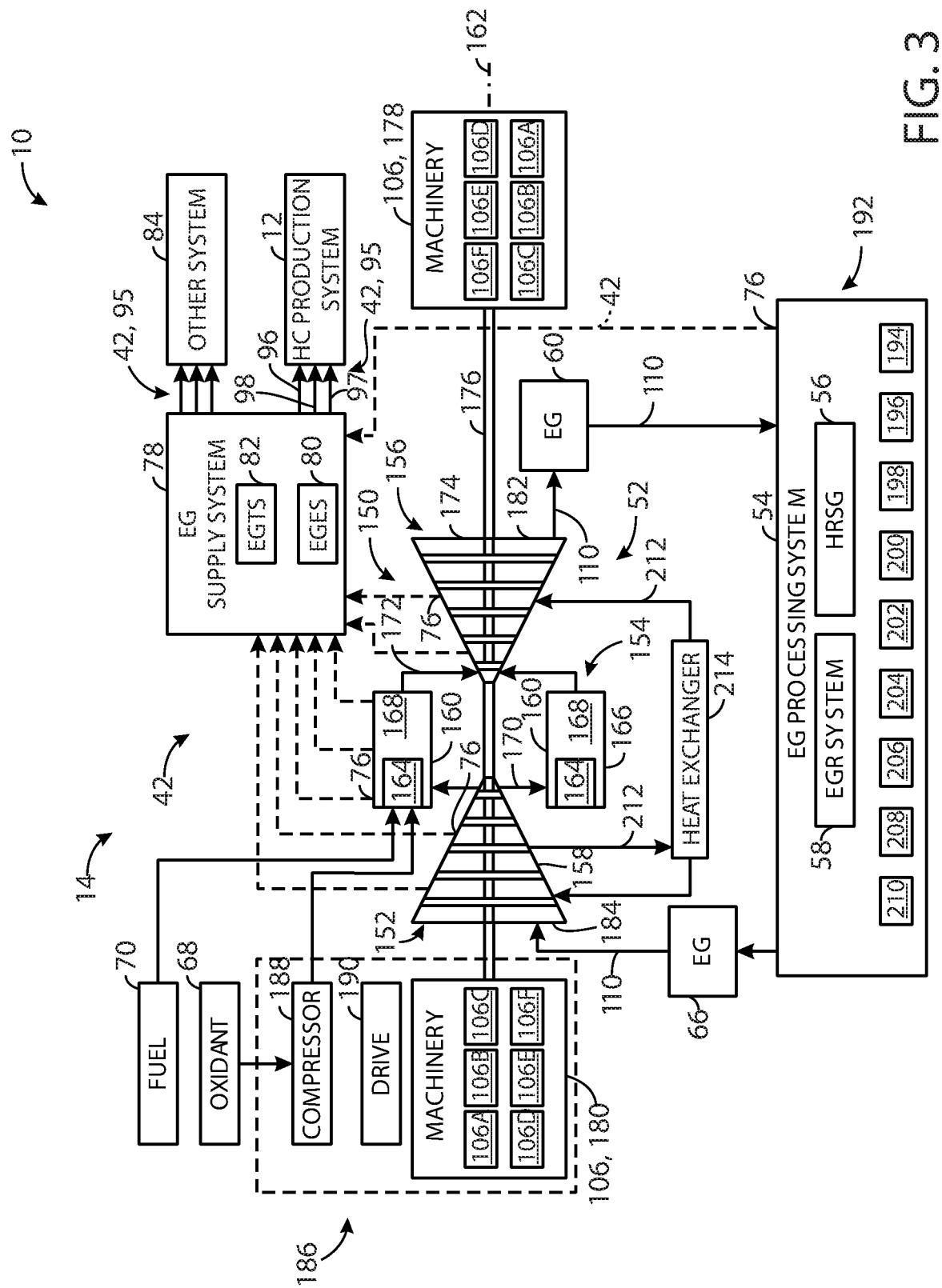
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact.

Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|------|------|------|------|------|------|
| MOC | GEN | | | | |
| MOC | GBX | GEN | | | |
| LP MOC | HP MOC | GEN | | | |
| HP MOC | GBX | LP MOC | GEN | | |
| MOC MOC | GBX | GEN | | | |
| HP MOC | GBX | GEN | LP MOC | | |
| MOC | GBX | GEN | | | |
| MOC | GBX | DRV | | | |
| DRV | GBX | LP MOC | HP MOC | GBX | GEN |
| DRV | GBX | HP MOC | LP MOC | GEN | |
| HP MOC | GBX CLR | LP MOC | GEN | | |
| HP MOC | GBX CLR | LP MOC | GBX | GEN | |
| HP MOC | GBX HTR STGN | LP MOC | GEN | | |
| MOC | GEN | DRV | | | |
| MOC | DRV | GEN | | | |
| DRV | MOC | GEN | | | |
| DRV | CLU | MOC | GEN | | |
| DRV | CLU | MOC | GBX | GEN | |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location. However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | OCU | BB | MRU | PRU | DIL |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
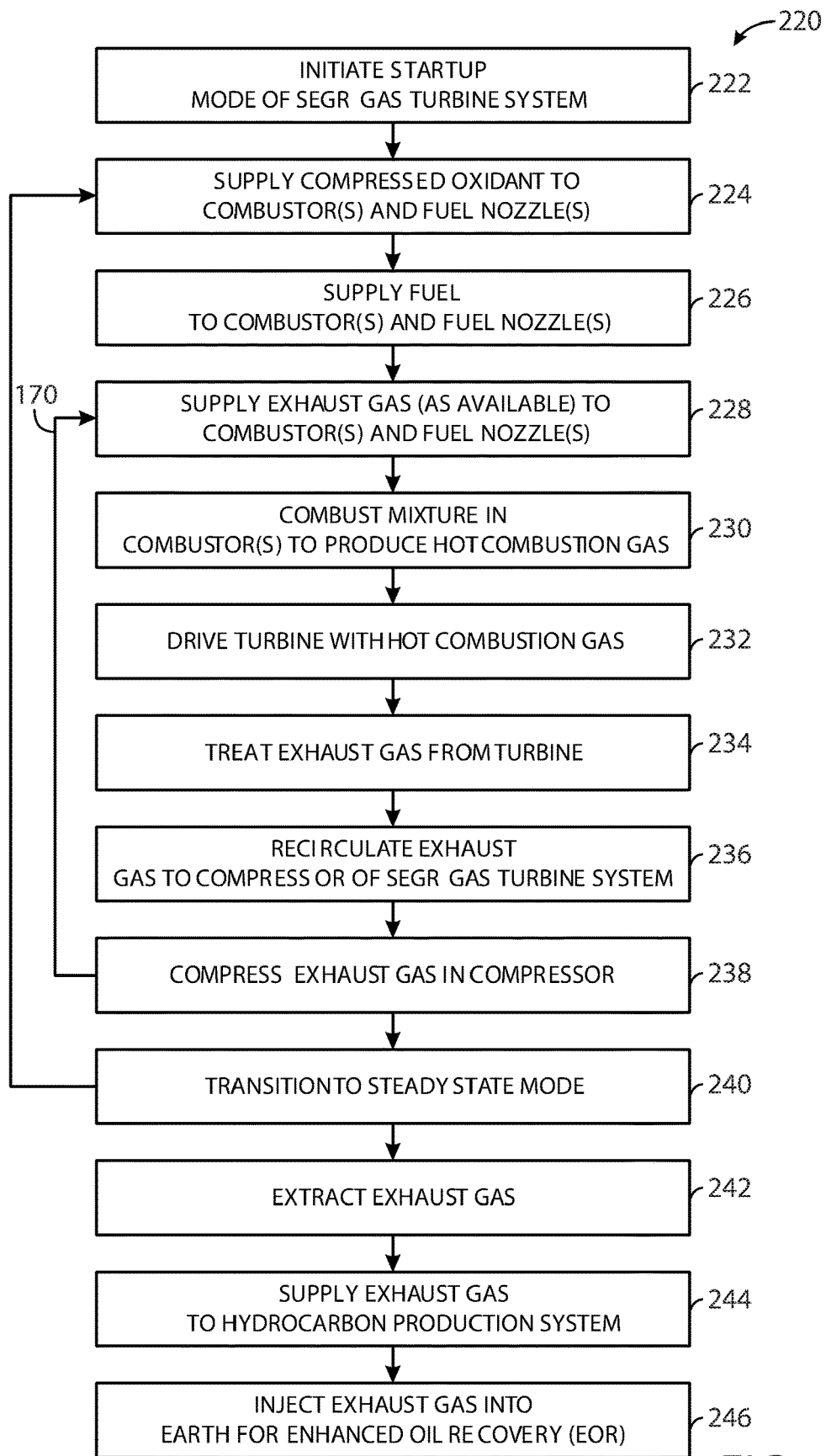
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

As noted above, the compressor section 152 receives recirculated exhaust gas 66 from the exhaust recirculation path 110, and compresses the recirculated exhaust gas 66 for use within other sections of the gas turbine engine 150 (e.g., the combustor section 160). As the exhaust gas 66 progresses through the compressor section 152, moisture associated with the exhaust gas 66 may interact with various features of the compressor. For example, airfoils of the compressor section 152, which rotate and act on the exhaust gas 66 to compress it, may have a reduced operational life due to repeated exposure to moisture within the exhaust gas 66. The moisture may, for example, condense and impact surfaces of the airfoils. This condensation may cause premature wear, erosion, and/or stress on the airfoils.

In some embodiments, certain compressor components such as airfoils may include a coating in addition to their base material of construction. The coating may cover the entire airfoil (or other compressor components such as rotating components), or only a portion of the airfoil susceptible to water droplet interactions. The coating may provide an additional level of resistance against degradation or performance reduction as a result of interactions between condensed water droplets from the exhaust gas and the component. In still further embodiments, compressor components may be treated (e.g., anodized) in order to enhance their robustness. In accordance with the present disclosure, in addition to or in lieu of using these coatings (or other types of material treatment, such as treatment of the base material), a system (e.g., an exhaust gas moisture control system) may be designed to monitor conditions relating to/indicative of exhaust gas moisture condensation as the exhaust gas progresses through the exhaust recirculation path 110 and into the compressor section 152. This monitoring may, in certain embodiments, enable control of conditions that contribute to exhaust gas moisture condensation by adjusting one or more operating parameters of the turbine-based service system 10. Therefore, in addition to or, rather than, mitigating the effects of condensation on components of the compressor section 152, the present embodiments enable active control and, in certain situations, mitigation of exhaust gas moisture condensation. For example, the exhaust gas moisture condensation may be controlled to within a predetermined (e.g., computer modeled) range to enhance compression efficiency, and/or in order to prevent its effects and increase the operational lifetime of the compressor components.

In accordance with an aspect of the present disclosure, the monitoring may result in a user-perceivable indication being provided (e.g., to a technician) by the system. The user-perceivable indication may provide an alert (e.g., an audible, visual, and/or tactile indication), and/or a more sophisticated indication (e.g., a number indicating the likelihood of condensation, a range of measured condensation relative to a predetermined range, water droplet size and/or flux, or any combination thereof) to the user to enable the user to perform adjustments to one or more operational parameters of the system 14.

In addition to (e.g., during and/or after) providing one or more user-perceivable indications, the system may perform one or more control actions to adjust an operating parameter of the gas turbine system 150 (or other component or system of the turbine-based service system 10) to control exhaust gas moisture condensation. For example, the system may automatically perform all or a subset of the control actions, or may perform all or a subset of the control actions after providing a user-perceivable indication (e.g., after a predetermined time delay). In still further embodiments, the system may provide the indication and perform the control actions upon receipt of an input from the user to control the exhaust gas moisture condensation.

Figure 5:
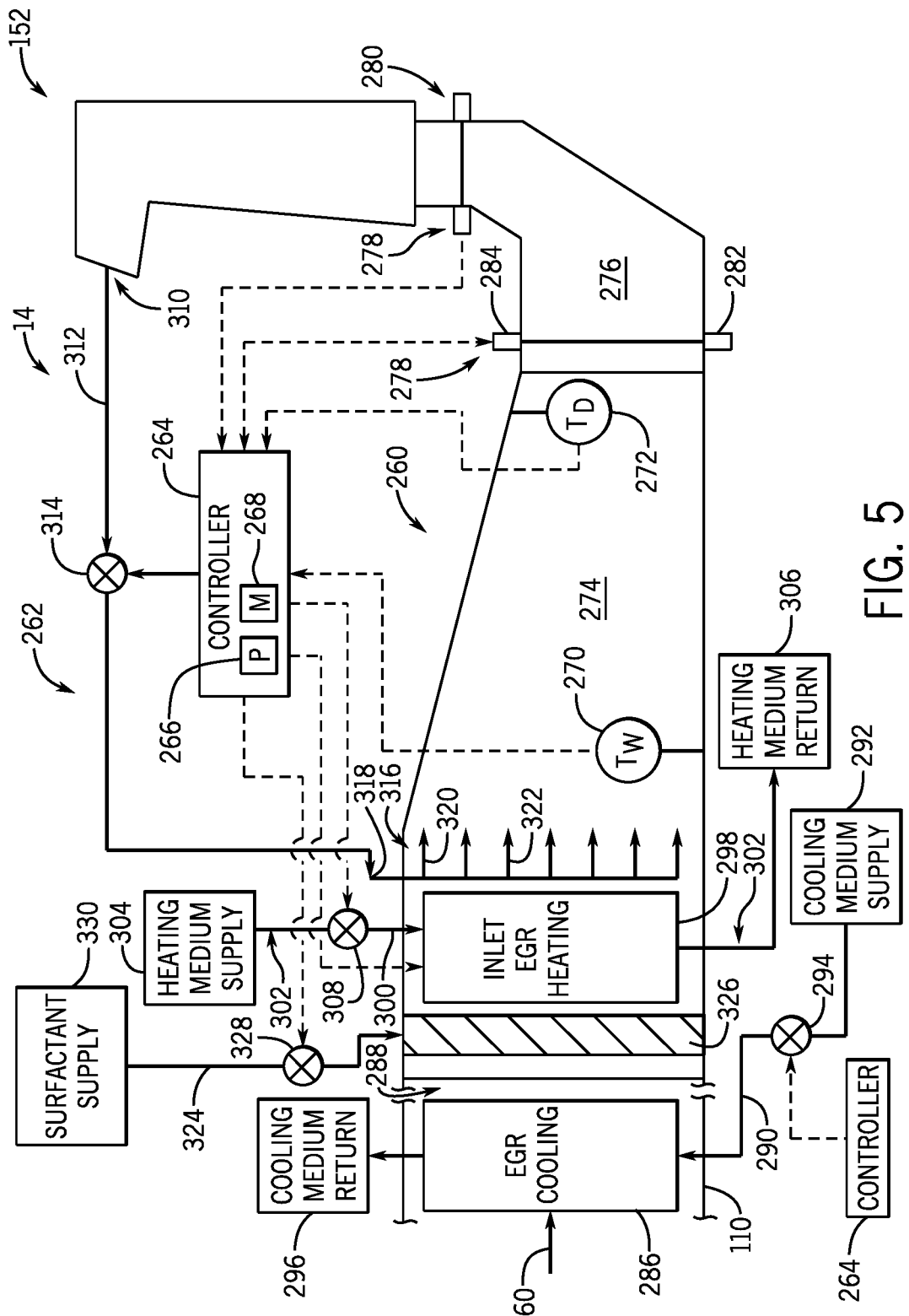
FIG. 5 is a diagram of an embodiment of the system of FIGS. 1-3, further illustrating details of an exhaust gas moisture control system configured to adjust condensing conditions of an exhaust gas before compression.

In accordance with the present disclosure, the control system 100 (or another more specific control subsystem) may utilize monitored parameters and may also coordinate operation of several subsystems that can affect the composition and/or temperature of the exhaust gas 60 flowing through the exhaust recirculation path 110 and the compressor section 152. FIG. 5 depicts an example embodiment of an arrangement of control features utilized by the control system 100 in order to adjust inlet conditions of the compressor section 152. While described in the context of and particularly useful for exhaust gas compressors of the type described herein, some or all of the present approaches may also be applied in other portions of the turbine-based service system 14, such as in the oxidant compression system 186 (FIG. 3).

The illustrated embodiment of the turbine-based service system 14 includes the compressor section 152, and a number of features that are utilized to adjust characteristics of the exhaust gas 66 within an inlet section 260 of the compressor section 152. Collectively, these components may be referred to herein as an exhaust gas moisture control system 262. The exhaust gas moisture control system 262, as illustrated, includes a controller 264, which may correspond to any controller of the control system 100 (e.g., controller 118). The controller 264 may include a processor 266 and memory 268 having generally the same configuration as described above with respect to the processor 120 and the memory 122. Indeed, the processor 264 will generally execute instructions stored on the memory 268 in order to monitor feedback and perform any one or a combination of the control actions described herein. The controller 264 is also intended to encompass a distributed control system in which various controllers are all communicatively connected to one another and/or communicatively connected to a separate (e.g., centralized) control system.

The exhaust gas moisture control system 262 may include any one or a number of various sensing and detection features that are individually or collectively configured to provide feedback to the controller 264 indicative of aspects of moisture condensation within the exhaust gas 66. These sensing/detection features may generally be referred to as a detection system having various components positioned throughout the compressor section 152, the exhaust recirculation path 110, or any other area of the system 14 affecting exhaust gas moisture. Indeed, certain embodiments of the system 14 may include features configured to monitor humidity levels of the ambient environment, the temperature of water from a body of water located relatively close to the system 14 (e.g., seawater), and the like. The monitoring may be intrusive (e.g., measurement devices that are disposed along the flow of the exhaust gas), or non-intrusive (e.g., measurement devices that monitor but do not interfere with the flow of the exhaust gas), or a combination of both. Furthermore, the sensing/detection features may include one or more stages of instrumentation placed at different axial positions of the compressor section 152. In this way, more than one measurement point may be used by the controller 264, which may be used to refine various algorithms, models, and transfer functions used by the controller 264 in performing some of the control actions described below.

In the illustrated embodiment, these sensing/detection features include, by way of non-limiting example, sensors used to detect humidity such as a dewpoint detection system including wet bulb thermometer 270 and a dry bulb thermometer 272, which together may provide feedback indicative of the relative humidity of the exhaust gas 66. While illustrated as being positioned within inlet ducting 274 of the compressor section 152, the wet bulb and dry bulb thermometers 270, 272 may be positioned elsewhere within the compressor section 152, such as in an inlet plenum 276. Indeed, any number of thermometers, psychrometers, or the like, may be utilized at any point within the compressor section 152 to provide feedback indicative of the humidity (e.g., relative humidity, specific humidity, absolute humidity) associated with the exhaust gas the that the particular measurement device is monitoring. Furthermore, the wet bulb and dry bulb thermometers 270, 272 may be positioned proximate one another, or may be spaced apart as illustrated. For example, both thermometers may be positioned where the wet bulb thermometer 270 is illustrated, or both thermometers may be positioned where the dry bulb thermometer 272 is illustrated, or both may be positioned together anywhere in the inlet section 260.

In addition to or in lieu of these temperature sensors, the detection system of the exhaust gas moisture control system 262 may include a droplet detection system 278 having a line of sight across an annular portion of the inlet section 260. In the illustrated embodiment, the droplet detection system 278 is positioned at the inlet plenum 276. However, the droplet detection system 278 may, additionally or alternatively, be positioned in a region 280 behind (e.g., downstream of) the bellmouth strut of the compressor. Indeed, in certain embodiments, there may be multiple (two, three, or more) stages of droplet detection instrumentation having the same or different configurations compared to one another. Such stages of instrumentation may enable the controller 264 to more accurately determine droplet growth characteristics via additional inputs and refinement of physics-based models, transfer functions, and so forth.

The droplet detection system 278 may generally include any intrusive or non-intrusive measurement system configured to measure droplet size, droplet flux, droplet volume, and/or droplet density of water within the exhaust gas 66. As illustrated, the droplet detection system 278 may include a light source 282 (e.g., a laser source, an infrared light source) that is configured to project the light across the inlet plenum 276 (or other monitored section) and a detector 284 that is configured to detect the light. Such a system would be considered to be non-intrusive in that the system does not substantially disrupt the flow of exhaust gas. For convenience, the droplet detection system 278 is depicted as only including these features, but the droplet detection system 278 may also include various controllers (e.g., programmed control circuits), prisms, power sources, stabilization features (e.g., to minimize vibration), and the like, as well as other redundant instrumentation (e.g., additional light sources and light detectors) positioned at different axial positions of the inlet section 260 of the exhaust gas compressor. The droplet detection system 278 may utilize any one or a combination of laser-based techniques, Doppler-based techniques, or similar techniques, to determine water droplet size. The controller 264 and the droplet detection system 278 are depicted as being communicatively coupled by a double-headed arrow, denoting that the controller 264 may control the operation of the droplet detection system 278, and may receive feedback indicative of water droplet size, water droplet volume, water droplet density, water droplet flux, or any combination thereof.

In some embodiments, it may be desirable to determine the droplet size, density, and/or flux of water within the exhaust gas as it enters into the sections where compression occurs, for example at an inlet guide vane (IGV) plane of the compressor section 152. Determining these parameters of the exhaust gas moisture at the IGV plane may provide a more accurate measurement of the moisture when the moisture interacts with the compressor components (e.g., due to its closer proximity to the compression stages compared to other portions of the compressor section 152).

On the other hand, as the inlet section 260 of the compressor section 152 leads to the IGV plane and, eventually the compression stages, the walls forming the plenum of the inlet section 260 may become thicker in order to withstand the higher pressures, temperatures, and vibration that occurs from the compression process. Accordingly, for at least these reasons, it may be difficult to integrate the droplet detection system 278 in this region of the compressor section 152. In addition, the vibrations that occur in this region may also introduce uncertainty into the measurements. Accordingly, in certain embodiments, the droplet detection system 278 may be integrated into a region of the inlet section 260 that experiences relatively low vibration forces (e.g., compared to the compression stages of the compressor). The inlet plenum 276 may correspond to such a region. The controller 264, as discussed in further detail below, may utilize one or more transfer functions to determine droplet characteristics for a downstream section of the exhaust gas compressor based on measurements performed at upstream sections of the exhaust gas compressor. The transfer functions, as noted above, may benefit from the use of multiple stages of instrumentation disposed at different axial positions of the inlet section 260, which may result in more accurate prediction of various droplet characteristics.

Example measurements and the manner in which these measurements are utilized in order to facilitate control of the exhaust gas 66 within the inlet section 260 are discussed in further detail below. As noted above, the exhaust gas moisture control system 262 may also encompass a combination of features configured to adjust a temperature and/or composition of the exhaust gas 60—specifically in order to control parameters of the exhaust gas 66 ultimately compressed by the compressor section 152. Again, the controller 264 may coordinate the operation of these components.

In the illustrated embodiment, for example, the controller 264 may control the operation of an EGR cooling system 286 in order to control cooling of the exhaust gas 60. The EGR cooling system 286, as shown, is positioned along the exhaust recirculation path 110 upstream of an exhaust gas intake 288 of the compressor section 152. The EGR cooling system 286 may include one or more direct contact coolers, one or more indirect heat exchangers (e.g., shell-and-tube), one or more psychrometric coolers, thermoelectric refrigeration modules, cryocoolers, or any other device suitable for cooling exhaust gas within the exhaust recirculation path 110.

In embodiments where the EGR cooling system 286 uses a fluid cooling medium, the controller 264 may control the flow of a cooling medium 290 from a cooling medium supply 292 and to and/or through the EGR cooling system 286 via one or more flow control devices 294 (e.g., a flow control valve, a pump) in order to adjust cooling of the exhaust gas 60 within the exhaust recirculation path 110. The cooling medium, having undergone heat exchange with the exhaust gas 60, may be sent to a cooling medium return 296 in order to replenish the cooling medium supply 292. In other embodiments, such as when the EGR cooling system 286 is electronically controlled, the controller 264 may send control signals to similarly adjust cooling of the exhaust gas 60.

In accordance with certain embodiments, the operation of the EGR cooling system 286 may be adjusted based on a number of factors, but may be based on the measurements performed by wet and dry bulb thermometers within the inlet section 260 (e.g., thermometers 270 and 272), and the droplet measurements performed by the droplet detection system 278. In one embodiment, the controller 264 may determine, based on feedback provided by these detection features, that a reduction in specific humidity of the exhaust gas 60 is appropriate. Increasing cooling by the EGR cooling system 286 may perform this reduction. In other words, the controller 286 may utilize the EGR cooling system 286 to reduce the specific humidity of the exhaust gas 60. With respect to exhaust gas, the specific humidity may also be referred to as a humidity ratio, which is a ratio of water vapor to dry gas in a particular volume of the exhaust gas. Therefore, increasing cooling by the EGR cooling system 286 may reduce the specific humidity, and thus the moisture content of the exhaust gas 60. In addition, the EGR cooling system 286 may be utilized to directly control the inlet temperature of the exhaust gas 66 (e.g., the temperature of the exhaust gas 66 when received by the compressor section 152 at the intake 288).

While cooling the exhaust gas 60 in this way may enable a reduction in its specific humidity, it should be noted that the cooling of the exhaust gas 60 is done with a combination of considerations in mind. For example, while it may be desirable to reduce the specific humidity of the exhaust gas 60 as much as possible by cooling using the EGR cooling system 286, there may be limitations as to the extent of cooling the EGR cooling system 286 is able to provide. There may be limitations on the availability of the cooling medium supply 292, the temperature of the cooling medium supply 292 (e.g., the cooling medium's temperature may be limited to a lower threshold), the heat capacity of the cooling medium 292 may be limited, and so on.

In accordance with the present disclosure, the cooling of the exhaust gas 60 may be coordinated with one or more other processes adapted to mitigate water droplet interaction with compressor components. In certain aspects of the present disclosure, the exhaust gas 66 received in the compressor section 152 from the exhaust recirculation path 110 (e.g., having been cooled by the EGR cooling system 286) may be heated using an inlet EGR heating system 298. The EGR inlet heating system 298 may be communicatively coupled to the controller 264 as illustrated, and may be any suitable device or system configured to exchange heat with the exhaust gas 66. By way of non-limiting example, the EGR inlet heating system 298 may be an electric heater (e.g., one or more resistive coils), a direct heat exchanger (e.g., heating of the exhaust gas 66 by directly contacting a heating fluid), an indirect heat exchanger (e.g., a shell-and-tube heat exchanger), or any other suitable heat exchanger.

In certain embodiments, the EGR inlet heating system 298 may utilize a stream of a heating medium 300, such as steam or another heated stream produced within the system 14. The heating medium stream 300 may flow along a heating medium supply path 302 extending from a heating medium supply 304, through the inlet EGR heating system 298, and to a heating medium return 306. The heating medium return 306 may regenerate the heating medium stream 300 (e.g., by re-heating), or may return the heating medium stream 300 back to the system 14 for use in another process.

In some embodiments, the heating medium supply 304, which is depicted generally, may correspond to one or multiple sections of the turbine-based service system 14. For example, as noted herein and/or discussed in further detail below with respect to FIG. 6, the heating medium supply 304 may be the EG supply system 78, the HRSG 56, additional heat generated by the EGR cooling system 286, or any combination of these or similar sections of the system 14 that generate a heated fluid. Additionally or alternatively, the heating medium supply 304 may, in some embodiments, include one or more compression stages of the compressor section 152.

Heating the exhaust gas using any one or a combination of the features noted above may be utilized in order to reduce the relative humidity of the exhaust gas 66. In the context of the exhaust gas 66, the relative humidity may provide an indication of the likelihood of moisture condensation therein. Therefore, in reducing the relative humidity of the exhaust gas 66 by heating the exhaust gas 66, the likelihood of moisture condensation is correspondingly reduced—thereby reducing the interactions of water droplets with compressor components.

The heating of the exhaust gas 66 may be controlled in a number of ways, depending on the particular configuration of the inlet EGR heating system 298 or other devices or systems used for this purpose. For example, the controller 264 may control the flow of the heating medium stream 300 along the heating medium supply path 302 by sending control signals to one or more flow control devices 308. The one or more flow control devices 308 may include one or more flow control valves, bleed valves, pumps, blowers, compressors, or any combination thereof.

Of the various sources of heat, compressed and heated exhaust gas generated by the compressor section 152 may be particularly suitable for decreasing the relative humidity of the exhaust gas 66. Indeed, because the exhaust gas becomes increasingly heated as it progresses through the various stages of the compressor section 152, the exhaust gas may be removed from any one or a combination of the compression stages, or at a discharge 310 of the compressor section 152. The compressed and heated exhaust gas may be referred to as an inlet bleed heat (IBH) stream 312, because the compressed and heated exhaust gas is "bled" from the discharge 310 and/or from compression stages, and therefore does not immediately contribute to combustion and work extraction processes at downstream sections of the gas turbine engine 150.

While the IBH stream 312 is illustrated in FIG. 5 as being a single stream, it should be noted that the IBH may be a single stream taken from a single location of the compressor, a single stream combined from separate locations of the compressor, multiple streams from multiple locations, or multiple streams from a single location but provided to different locations within the inlet section 260 of the compressor section 152.

The flow of the IBH stream 312 into the inlet section 260 may be controlled by the controller 264 using one or more flow control devices 314. Because the IBH stream 312 will generally be of a high velocity due to the energy gained from compression, the one or more flow control devices 314 will generally include one or more flow limiting devices, such as flow control valves, pressure regulators, bleed valves, or any other flow limiting devices.

In some embodiments, the IBH stream 312 may be delivered into the inlet section 260 using a single outlet, such as a valve opening positioned within the inlet section 260, or using multiple outlets that disperse the IBH stream 312 within the inlet section 260. As illustrated in FIG. 5, the IBH stream 312 may flow into a manifold 318 positioned within the inlet section 260. The manifold 316 may include a single inlet 318, or may include multiple inlets disposed at different locations along the axial direction of the inlet ducting 274. The manifold 320, as shown, includes multiple outlets 320 so as to disperse the IBH stream 312 as different IBH portions 322 in different longitudinal and/or axial locations of the inlet section 260. The manifold 316 may have any shape, such as annular, straight, curved, and so on.

As noted above, among other effects, heating of the exhaust gas 66 within the inlet section 260 may reduce the relative humidity of the exhaust gas 66, which may be recognized by an increase in the dry bulb temperature relative to the wet bulb temperature. While the cooling of the exhaust gas 60 (e.g., in order to reduce the specific humidity of the exhaust gas) within the exhaust recirculation path 110 may be limited by the capabilities of the EGR cooling system 286 and a desired inlet temperature, the heating of the exhaust gas 66 may be limited primarily by the design specifications of the compressor section 152, though there may be additional considerations. For example, if the IBH stream 312 is utilized to a great extent to increase the temperature of the exhaust gas 66, the resulting exhaust gas 66, while having a low relative humidity, may have a temperature that is higher than appropriate for the compressor section 152. In this way, the present embodiments provide for the reduction in specific humidity (by cooling) to be balanced with a reduction in relative humidity (by heating) in order to achieve control over exhaust gas moisture condensation as the exhaust gas progresses through the compressor section 152. Stated differently, balancing cooling of the exhaust gas 60 and heating of the exhaust gas 66 may be performed in order to minimize the temperature monitored by the dry bulb thermometer 272 (the dry bulb temperature), the flow of the IBH stream 312, and any associated penalty to the efficiency of the overall gas turbine cycle.

Reducing the moisture content of the recirculated exhaust gas via cooling and decreasing the likelihood of exhaust gas moisture condensation via heating may be coupled with inhibiting water droplet growth via a reduction in surface tension using a surfactant flow 324 and/or using one or more filters 326. By way of example, the surfactant flow 324 may include any one or a combination of surfactants that are capable of reducing the surface tension of water in order to prevent water droplet nucleation. Some non-limiting examples of surfactants include conjugate bases of alkylsulfonic acids (e.g., sodium dodecyl sulfate), glycol-based surfactants (e.g., polyethylene glycol, propylene glycol, block copolymers of alkylene oxides), and similar compounds. The surfactant flow 324 may be injected into a flow of the exhaust gas 66 within the inlet section 260, for example fluidly between the EGR cooling system 286 and the inlet EGR heating system 298, downstream of the inlet EGR heating system 298, or any other position within the inlet section 260. In some embodiments, the surfactant flow 324 may be injected into the exhaust gas 66 after atomization (e.g., as a fine spray and/or vapor) so as to enhance interaction between the surfactant flow 324 and the exhaust gas 66.

In still further embodiments, the surfactant flow 324 may be provided to the filter 326, which may include various internal conduits, microchannels, and the like, that provide a relatively large surface area to enhance interactions between the surfactant flow 324 and the exhaust gas 66. The filter 326 may also be utilized without the surfactant flow 324. For example, the filter may be a moisture filter (e.g., membrane-based, such as an expanded fluoropolymer membrane filter), or may be a filter having desiccant media disposed thereon or flowing therethrough. The desiccant media may be a salt (e.g., sodium bicarbonate, calcium oxide, calcium sulfate, calcium chloride, silica, clays, and molecular sieves) or a liquid-based desiccant (e.g., brine solutions, salt water, solutions of the desiccant salts noted above) that at least partially absorbs and thereby removes moisture from the exhaust gas 66. Indeed, in certain embodiments, the desiccant may be regenerated at regular intervals or as needed in order to maintain its ability to remove moisture from the exhaust gas 66.

The surfactant flow 324 into the inlet section 260 may be controlled by the controller 264 via one or more flow control devices 328 positioned fluidly between the compressor section 152 and a surfactant supply 330. The one or more flow control devices 328 may include one or more flow control valves, one or more pumps, one or more blowers, or any other suitable flow control device. The surfactant flow 324 may be controlled by the controller 264 based on a number of factors, including but not limited to the cooling capacity of the EGR cooling system 286, the heating capacity of the inlet EGR heating system 289, the measured dry and wet bulb temperatures of the exhaust gas 66, the measured water droplet size of the exhaust gas 66, water droplet volume of the exhaust gas 66, water droplet flux of the exhaust gas 66, or any combination thereof.

It should be appreciated from the foregoing that a number of flow paths and connections may be possible in order to facilitate control of exhaust gas moisture condensation in accordance with the present disclosure, depending at least on the types of cooling and heat sources utilized, as well as any type of additional processing performed on the cooling and/or heating flows before and/or after heat exchange with the exhaust gas. An example embodiment of the manner in which various portions of the turbine-based service system 14 may be connected in order to facilitate control of the exhaust gas moisture condensation is depicted in FIG. 6.

Figure 6:
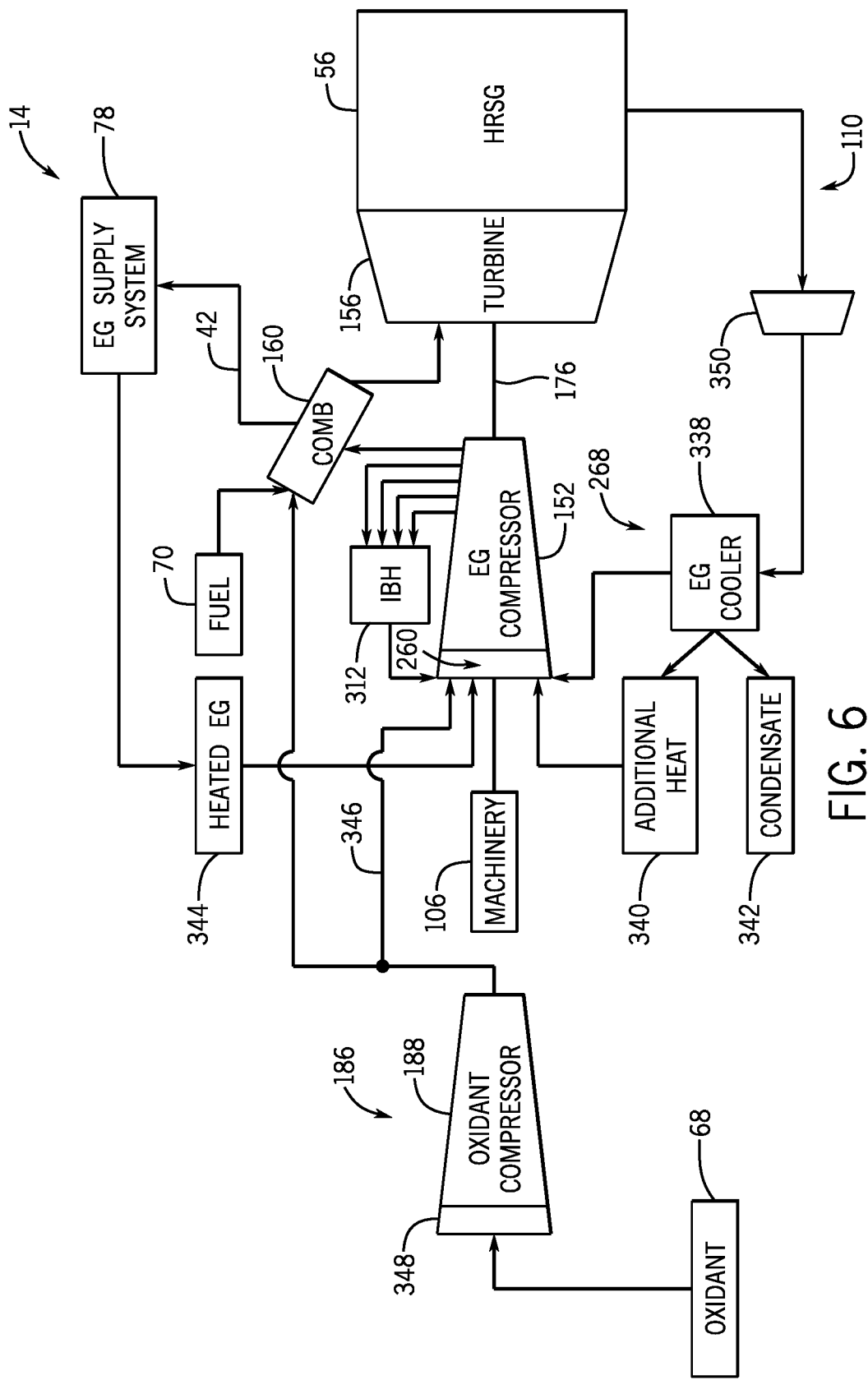
FIG. 6 is a diagram of an embodiment of the turbine-based service system of FIG. 5, further illustrating the manner in which various components of the system may be fluidly coupled to the inlet section of the compressor in order to heat exhaust gas within the inlet section.

In the embodiment illustrated in FIG. 6, the compressor section 152 is fluidly coupled to the exhaust recirculation path 110, which enables the compressor section 152 to receive the recirculated exhaust gas 66, as discussed above. As noted above, at least a portion of the EGR cooling system 268, such as an EGR cooler 338 (e.g., a direct contact cooler or indirect heat exchanger, as discussed above) may be disposed along the exhaust recirculation path 110, as is depicted in FIG. 6, and may cool the exhaust gas 60 in order to generate the recirculated exhaust gas 66 received by the compressor section 152.

As noted above, cooling the exhaust gas 60 may reduce the specific humidity of the exhaust gas—in effect removing water from the exhaust gas 60 and transferring heat to the cooling medium flow 290 (FIG. 5). This may generate a source of additional heat 340 and condensate 342. The compressor section 152 may also be fluidly coupled to the additional heat source 340. The additional heat source 340 may be utilized as the heating medium supply 304 discussed above with respect to FIG. 5 in order to heat the recirculated exhaust gas 66. Accordingly, not only does the EGR cooling system 268 remove heat from the exhaust gas 60, but the removed heat may be utilized as a heating medium source for, e.g., indirect heat exchange with, the recirculated exhaust gas 66 in order to reduce the relative humidity thereof.

As also illustrated, the inlet section 260 of the compressor section 152 may be fluidly coupled to downstream portions of the compressor section 152, such as to one or more downstream compression stages, or at the discharge of the compressor. This fluid coupling allows the IBH stream 312 to be provided for direct or indirect heat exchange. While the removal of the IBH stream 312 may cause a cycle penalty in terms of the immediate output of the gas turbine system 150, it should be appreciated that in recycling a certain amount of the compressed exhaust gas to a forward section of the compressor section 152 to reduce moisture condensation, that the compressor may be run for longer periods and with a reduced chance of downtime for parts replacement and maintenance.

Additionally or alternatively, the inlet section 260 may be fluidly coupled to the EG supply system 78 in order to receive a heated EG stream 344. As discussed above with respect to FIG. 3, the EG supply system 78 may include the EG treatment system 82 (FIG. 3), which may be configured to remove water from extracted exhaust gas 42 and compress the extracted exhaust gas. Accordingly, the heated EG stream 344 may be compressed and dehydrated compared to the exhaust gas 66 received by the inlet section 260 from the exhaust recirculation path 110. The EG supply system 78 may therefore be considered to be one of the components of the heated medium supply 304.

The source of heat utilized in the inlet section 260 is not particularly limited, but it will be appreciated that certain sources may be more beneficial and/or effective than others. Further, while the IBH stream 312 is presently depicted as being removed from the compressor section 152 (an EG compressor), a compressed oxidant bleed stream 346 may be used as well. Indeed, the compressed oxidant bleed stream 346 may be a bleed stream taken from a discharge of the oxidant compressor 188, or from one or more compression stages thereof. In addition, while the present embodiments are discussed in the context of the compressor section 152 that compresses exhaust gas (exhaust gas compressors, which may also be referred to as a recycle compressor), the present approaches may also be applied to an inlet section 348 of the oxidant compressor 188. Thus, any one or a combination of the embodiments described herein may be utilized, in addition to or in lieu of controlling moisture condensation of the exhaust gas 66, to control moisture condensation of the oxidant 68.

The techniques described herein are also not limited to heat exchange, but also may include adjusting other parameters in addition to the heating and cooling of the exhaust gas. Indeed, other operational parameters that may indirectly affect the extent to which the exhaust gas is cooled and/or heated may be adjusted. As one example, a blower 350 disposed along the exhaust recirculation path 110 may adjust a flow rate of the exhaust gas 60 in order to adjust the volume of exhaust gas operated on by the EGR cooling system 268 and/or the inlet EGR heating system 298. As illustrated, the blower 350 is positioned along the exhaust recirculation path 110, upstream of the EGR cooling system 268. Thus, in adjusting the flow rate of the exhaust gas 60 along the path 110, the blower 350 may adjust the amount of exhaust gas 60 cooled at any one time within the EG cooler 338. The blower 350, or another flow controlling device, may alternatively or additionally be positioned between the EG cooler 338 and the inlet section 260. Such a flow control device may adjust the amount of exhaust gas heated at any given time within the inlet section 260.

Figure 7:
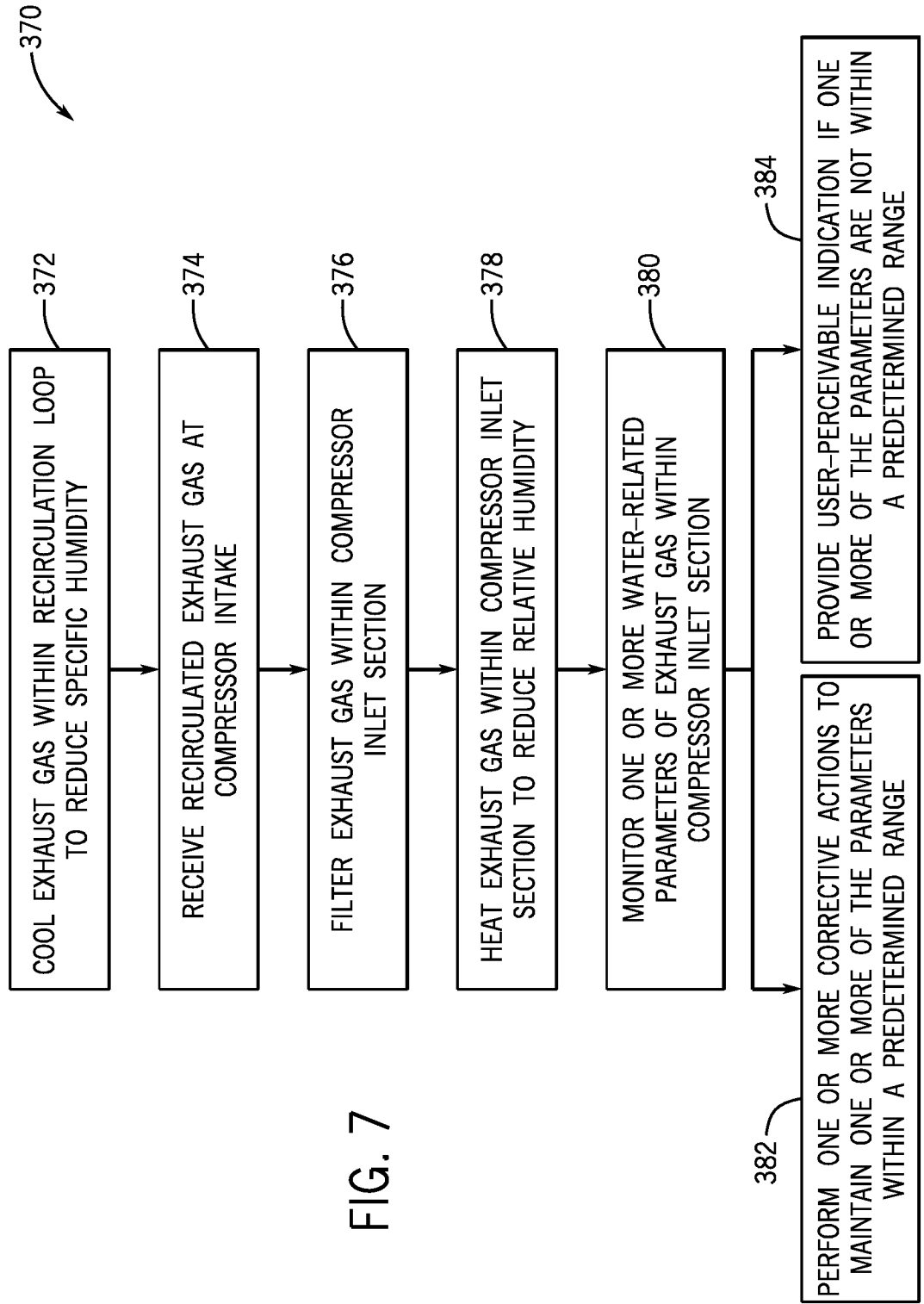
FIG. 7 is a flow chart of an embodiment of a process of operating the exhaust gas moisture control system of FIGS. 5 and 6.

FIG. 7 is a process flow diagram depicting an embodiment of a method 370 corresponding to certain operational steps that may be performed in accordance with embodiments of the present disclosure. The method 370 includes cooling (block 372) the exhaust gas 60 within the exhaust recirculation path 110 (e.g., a recirculation loop) in order to reduce the specific humidity of the exhaust gas 60. As noted above with respect to FIGS. 5 and 6, cooling in accordance with block 372 may include using the EGR cooling system 268 to perform direct or indirect heat exchange between a cooling medium and the exhaust gas 60. The temperature of the resulting recirculated exhaust gas 66 may monitored at a portion of the exhaust recirculation path 110 downstream of the EGR cooling system 268, and/or at the intake 288 of the compressor section 152, and/or at another position within the inlet section 260 upstream of the inlet EGR heating system 298. This temperature may, in certain embodiments, be referred to as the inlet temperature of the exhaust gas compressor.

The controller 264 (e.g., of the control system 100) may control cooling of the exhaust gas in accordance with block 372. For example, in response to a measured inlet temperature, a measured wet bulb temperature in the inlet section 260, a measured dry bulb temperature in the inlet section 260, a measured droplet volume, a measured droplet size, a measured flux of water, or any combination thereof, the controller 264 may adjust a parameter of the EGR cooling system 286 to bring the respective measurement(s) to within a desired range.

The method 370 may include receiving (block 374) the recirculated exhaust gas 66 at the intake 288 of the compressor section 152. In certain embodiments, this may include receiving a continuous influx of all or a portion of the exhaust gas. The method 370 may also include filtering (block 376) the exhaust gas 66 according to any one or a combination of the techniques described above with respect to FIG. 5 (e.g., removing water by filtration, utilizing one or more desiccants, utilizing one or more surfactants). Thus, the act of filtering the exhaust gas 66 may also include reducing the surface tension of the water associated with the exhaust gas 66.

The controller 264 may control at least a part of the filtration process. For example, the controller 264 may, in response to one or more measured parameters of the exhaust gas 66 and/or the desiccant/surfactant, adjust a flow rate of the desiccant and/or surfactant through the filter 326 (FIG. 5) in order to adjust the respective parameter to within a predetermined range. Such parameters may include a measured inlet temperature, a measured specific humidity, measured parameters related to water droplets, or the like.

The method 370 further includes heating (block 378) the exhaust gas 66 within the inlet section 260. As discussed above with respect to FIG. 5, this heating may be performed using any one or a combination of heat sources and heat exchangers. The heating of the exhaust gas 66 will generally be performed downstream of the cooling process, but embodiments wherein the exhaust gas 66 is heated before cooling are also contemplated herein. Indeed, in some embodiments it may be desirable to cause maximum water condensation (and associated water removal) before the exhaust gas 66 is received by the inlet section 260 by cooling so that the energy required to reduce the relative humidity by heating is reduced. This reduction in the required energy may correspond to a reduction in gas turbine cycle efficiency losses.

The method 370 also includes monitoring (block 380) one or more water-related parameters of the exhaust gas 66 within the inlet section 260. The monitoring in accordance with block 380 will generally be performed by the controller 264 in order to facilitate automatic responses when feedback indicates that a corrective action should be taken. For example, the controller 264 may monitor the wet bulb and dry bulb temperatures in order to determine a relative humidity of the exhaust gas 66 within the inlet section 260. The controller 264 may also monitor the size of water droplets within the exhaust gas. For instance, the controller 264 may monitor the droplets to determine the percentage of droplets having a size at or below a certain value. One common way of representing such a measure is, for example, $D_x=y$, where D indicates diameter and x indicates the percentage of droplets having a diameter equal to or less than a value of y. By way of non-limiting, illustrative example only, if the exhaust gas water droplets have a $D_{50}$ of 1 micron, then 50 percent of the water droplets have a diameter less than or equal to 1 micron. Similarly, if a given parcel of exhaust gas 66 has water droplets with a $D_{90}$ of 1.5 microns, then 90 percent of the water droplets have a diameter less than or equal to 1.5 microns. Similar measures may be performed for droplet volume (e.g., $DV_{50}$, $DV_{90}$, where DV is droplet volume), DD (e.g., $DD_{50}$, $DD_{90}$, where DD is droplet density), or any combination of these and other measures. The parameters may also include a flux of the water in the exhaust gas 66 (e.g., representing the amount of water in a given parcel of exhaust gas 66), or any other similar representation.

In response to monitoring in accordance with block 380, the method 370 may include either or both of performing (block 382) one or more corrective actions or providing (block 384) one or more user-perceivable indications to a user. The corrective actions may be performed automatically by the controller 264 in order to maintain or return one or more of the monitored parameters to within a predetermined range. The user-perceivable indication may indicate to a user that one or more adjustments are recommended in order to maintain or return the monitored parameter within the predetermined range.

In certain embodiments, the controller 264 may provide one or more user-perceivable indications in accordance with block 384 by providing an audible, visual, or tactile alert. The alert may signal to a user that attention is needed at a particular workstation, or may provide additional information as to the particular situation that triggered the alert. In some of these embodiments, the controller 264 may provide the user-perceivable indication and, if no action is taken to remedy the situation after a predetermined amount of time, then the controller 264 may proceed to performing a corrective action in accordance with block 382.

Accordingly, the controller 264 may have a variety of operating modes, including a detect-and-respond mode, where the controller 264 detects feedback indicative of a moisture-related parameter being out of a desired (e.g., predetermined) range, and performs a corrective action; a detect-and-alert mode, where the feedback causes the controller 264 to provide a user-perceivable alert; and a detect-alert-respond mode, where the feedback causes the controller 264 to initially alert the user, followed by the performance of a corrective action, or the feedback causes the controller 264 to alert the user and perform the corrective action at about the same time (e.g., the alert is provided as the corrective action is performed).

The controller 264 may determine whether a corrective action should be performed based on a number of factors, a portion of which are discussed herein. By way of example, the controller 264 may determine a range having an upper and lower threshold for a variety of parameters relating to the exhaust gas 66, and more specifically to moisture in the exhaust gas 66. In some embodiments, the controller 264 may utilize a physics-based model that utilizes a variety of inputs to determine appropriate ranges for the exhaust gas temperature, exhaust gas relative and specific humidity, water droplet volume, size, flux, and density, wet bulb temperature, dry bulb temperature, and so forth.

The physics-based models may enable variable inputs relating to the compressor equipment (e.g., the construction of the airfoils, materials of the airfoils, size of the airfoils), environmental conditions (e.g., seawater temperature, atmospheric temperature, pressure, humidity, and/or dew point), desired turbine output (e.g., desired product gas output, desired electrical generator output for electrical power), combustion dynamics, exhaust emissions, and the like. Based on these inputs (among other potential inputs), the model may determine appropriate ranges for any one or a combination of the exhaust gas moisture-related parameters noted above. If the controller 264 determines (based on sensor/detector feedback) that the moisture-related parameters are not within the desired range, then the controller 264 may also have responses that are predetermined based on the physics-based model, potentially in combination with other feedback. For example, if the controller 264 determines that the relative humidity of the exhaust gas 66 is too high, then the model may call for the exhaust gas 66 to be heated by the inlet EGR heating system 298. However, the feedback may also indicate that the dry bulb temperature is approaching an upper threshold, which may be determined by the model based on the operational limitations of the compressor, for example. In such an embodiment, the controller 264 may mitigate moisture condensation by increasing cooling of the exhaust gas 60 in the exhaust recirculation path 110, and/or by increasing a flow of a desiccant and/or surfactant to contact the exhaust gas 66 for moisture removal and/or water surface tension reduction, respectively. It will be appreciated that any number of these types of control may be possible, and are within the scope of the present disclosure.

Figure 8:
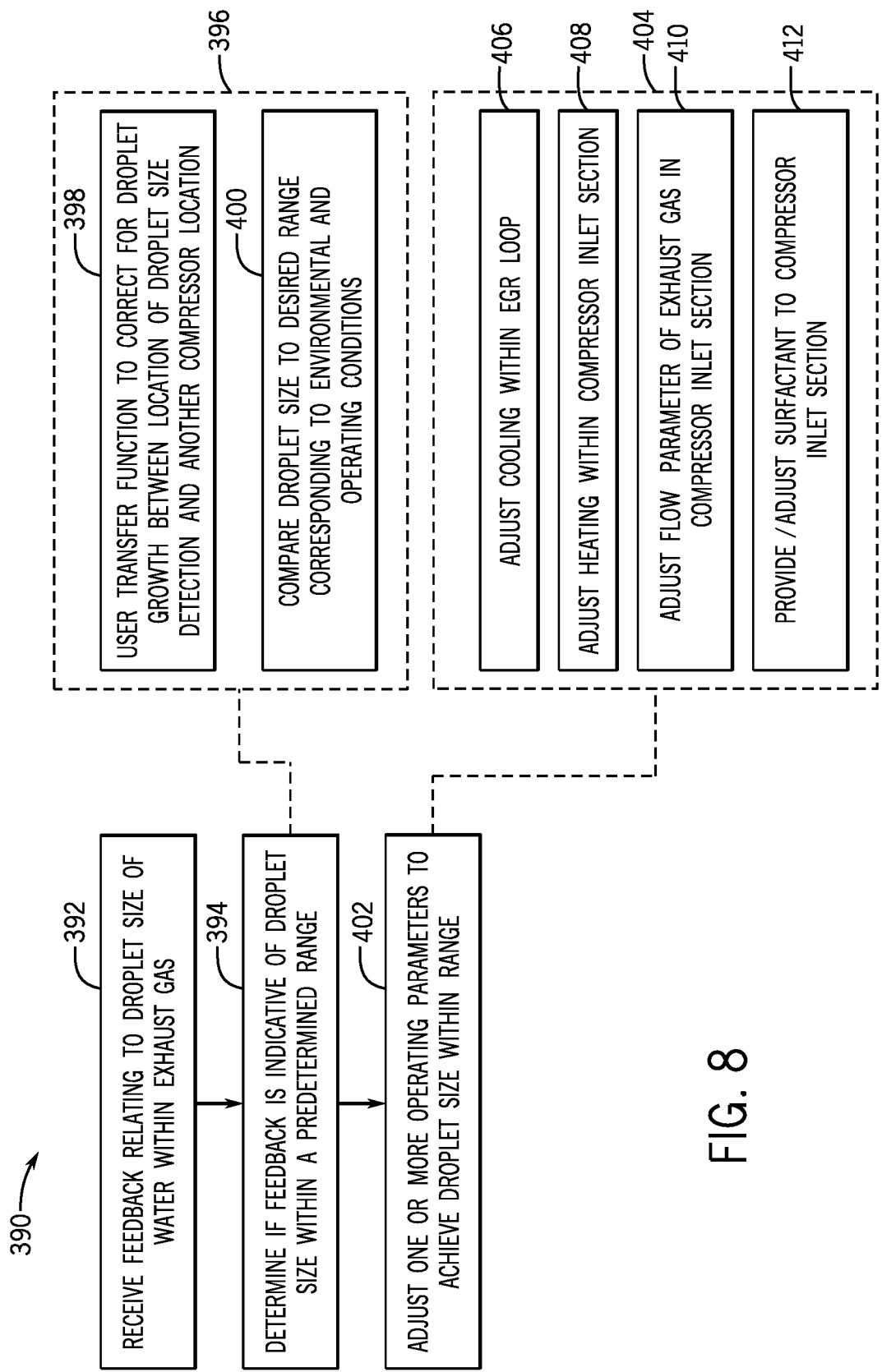
FIG. 8 is a process diagram of an embodiment of a control scheme depicting the manner in which the controller of FIG. 5 may operate to control water droplet size as a function of droplet size measurements.

An embodiment of the manner in which the controller 264 may control and adjust various operating parameters of the exhaust gas moisture control system 262 is depicted in FIG. 8 as a process diagram of a control scheme 390. Specifically, the control scheme 390 includes various embodiments of control actions and various processes that may occur as a result of water droplet detection using feedback from the droplet detection system 278. Further, while the embodiments described with respect to FIG. 8 are presented in the context of feedback relating to droplet size, they are also applicable to other feedback, such as droplet volume, droplet flux, droplet density, and the like. In addition, it should be noted that any one or a combination of the processes described below (and, indeed, any control actions performed by the controller 264 described above) may be performed by the controller 264 by executing, using the processor 266, instructions stored on the memory 268 (which, again, is non-transitory—i.e., does not include signals). In denoting the actions of the controller 264 (e.g., the controller 264 is "configured to" perform certain actions, or the controller 264 performs certain actions), it should be borne in mind that such actions are performed using tangible processing components including the memory 268 storing the instructions. Thus, the memory 268 is specifically programmed with instructions for carrying out the processes described herein so that the controller 264 is configured to perform the tasks described herein. The control scheme 390 may also represent various indications presented to a user (e.g., a technician) in order to perform appropriate control actions upon receipt of a user input.

In the control scheme 390, as illustrated, the controller 264 receives (block 392) feedback relating to water droplet size within a particular parcel of recirculated exhaust gas 66, as measured by the droplet detection system 278. The feedback may include detected water droplet size (e.g., volume, diameter) as a function of time, or may include averages of water droplet size, for example a $D_{50}$, $D_{75}$, or $D_{90}$ value, or any combination thereof, for the water droplet diameter; a $DV_{50}$, $DV_{75}$, or $DV_{90}$ value, or any combination thereof, for the water droplet volume; a $DD_{50}$, $DD_{75}$, or $DD_{90}$ value, or any combination thereof, for the water droplet density (e.g., weight of water per droplet), or any combination of these and other measurements. Of the measurements noted above, the $D_{50}$, $D_{75}$, or $D_{90}$ value, or any combination thereof, for the water droplet diameter of water within the recirculated exhaust gas 66, may be readily produced by the droplet detection system 278 using laser and/or Doppler diameter detection techniques. Furthermore, the controller 264 may be configured to receive raw, unprocessed feedback produced by the droplet detection system 278, or may be configured to receive processed feedback indicating specific measurement values. In other words, in some embodiments, by way of example, the controller 264 may be configured to calculate water droplet diameter $D_{50}$, $D_{75}$, or $D_{90}$ values, or may receive water droplet diameter $D_{50}$, $D_{75}$, or $D_{90}$ values from the droplet detection system 278. Thus, the droplet detection system 278 may include its own processing components (e.g., a processor configured to execute instructions and a memory storing the instructions) in communication with the controller 264.

The controller 264 may also determine (block 394) if the feedback is indicative of droplet size measurements outside of a predetermined range. The predetermined range may be the result of a variety of inputs, including the inputs provided to a physics-based model discussed above with respect to FIG. 7. Indeed, the controller 264, in performing the acts represented by block 394, may also perform a number of sub-routines 396 relating to further processing of the received feedback.

In one example sub-routine, depending on the location of the droplet detection system 278 within the inlet section 260 (e.g., its location along the axial direction of the inlet section 260), the controller 278 may utilize (block 398) a transfer function to estimate or determine the droplet size at other locations within the compressor section 152. For example, it should be appreciated that as a given droplet of water travels in the axial direction along the inlet section 260 from the intake 288 to the IGV plane (just upstream of the compression stages, such as at the bellmouth strut), the droplet of water may increase in size due to coalescence with nearby water droplets. The extent to which droplet growth occurs may therefore depend on a number of factors, including those relating to the amount of water within the recirculated exhaust gas 66. In other words, the more water present within the recirculated exhaust gas 66, the greater the likelihood that the droplet will grow in size. Factors contributing to the droplet growth may be monitored by monitoring humidity levels (e.g., specific and/or relative humidity), among others. Utilizing the transfer function in accordance with block 398 may be desirable to determine the extent of interactions between water droplets and the compressor equipment, which, as noted above, may contribute to increasing the operational life of the equipment. Indeed, the utilization of a transfer function may enable accurate and precise estimations of humidity parameters at sections of the compressor section 152 where monitoring would be difficult, for example due to the difficulty associated with the integration of a measurement device in the particular region. In one embodiment, the controller 278 may utilize the transfer function to control droplet size at the inlet bellmouth, which is a difficult area in which to integrate a measurement device.

A transfer function that estimates or determines a droplet size of a downstream location based on a droplet size measured at an upstream location may take into account not only measured humidity levels, but also average water droplet size, droplet diameter $D_{50}$, $D_{75}$, or $D_{90}$ values, or the like. In certain embodiments, the output of the transfer function may be an estimated droplet size value (e.g., estimated droplet diameter $D_{50}$, $D_{75}$, or $D_{90}$ values) at a location downstream of the droplet detection system 278 within the inlet section 260, or within the compression stages, or a combination thereof. While such a transfer function may be useful in that it may reduce the number of model inputs and associated processing requirements, embodiments where no transfer function is utilized are also presently contemplated. In still further embodiments, the model may itself include instructions that essentially perform the transfer function.

In performing the sub-routines 396, the controller 264 may also compare (block 400) the determined droplet size discussed above (e.g., the estimated droplet size after the transfer function is performed, or the measured droplet size, or both) with a desired range that is determined using the physics-based model. The physics-based model may take into account various operational and environmental conditions in determining the desired range for the droplet size. For example, the physics-based model may account for the loading of the gas turbine system 150 (FIG. 3), the configuration (e.g., size, shape, material construction) of the compressor components (e.g., rotating components such as airfoils and/or compressor wheels), parameters relating to the exhaust gas (e.g., flow rate of the exhaust gas 60 along the exhaust recirculation path 110, composition of the recirculated exhaust gas 66, inlet temperature of the recirculated exhaust gas 66, specific and relative humidity of the exhaust gas), or any combination of these and other parameters, to determine an appropriate range for the droplet size.

The control scheme 390 presented in FIG. 8 assumes that the droplet size measured in accordance with block 392 is outside of the predetermined range in order to facilitate discussion. However, it should be noted that in some embodiments, the measured droplet size may be within the predetermined range. In such embodiments, no control actions may be performed, or active control over the droplet size may be performed in order to ensure that the droplet size stays within the predetermined range. For example, the controller 264 may determine that due to recent environmental changes (e.g., changes in weather), the recirculated exhaust gas 66 is likely to have a higher moisture content. In such embodiments, the controller 264 may store additional sources of heat and/or cooling media, may produce additional heating and/or cooling media, or may otherwise prepare the exhaust gas moisture control system 262 to handle additional moisture.

The controller 264, upon determining that the droplet size is outside of a prescribed range, may adjust (block 402) one or more operating parameters of the exhaust gas moisture control system 262, and/or other operating parameters of the gas turbine system 150 (e.g., loading, rate of the blower 350 (FIG. 6)). The actions represented by block 402 may include a series of control actions (block 404), which may all be interrelated, and which may depend on other factors, including temperature and/or humidity measurements of the exhaust gas 60 and/or recirculated exhaust gas 66.

As illustrated, the control actions 404 include adjusting (block 406) cooling of the exhaust gas 60 within the loop (e.g., the exhaust recirculation path 110), adjusting (block 408) heating of the exhaust gas 66 within the inlet section 260, adjusting (block 410) a flow parameter of the exhaust gas 66 within the compressor inlet section 260, and providing/adjusting (block 412) surfactant to the compressor inlet section 260, to name a few. Again, these control actions may all be interrelated, and may also depend on outputs generated by the physics-based model described above.

The acts represented by block 406 (i.e., adjusting cooling) may correspond to an adjustment in the operating parameters associated with block 372 of FIG. 7, and may correspond to an adjustment in the flow rate of a cooling medium through the EGR cooling system 286 (FIG. 5), an adjustment in the temperature of the cooling medium of the EGR cooling system 286, or any other parameter adjustment. Again, the cooling may be performed to reduce the specific humidity of the exhaust gas 60, and may be limited by the physical and chemical properties of the cooling medium, the capabilities of the EGR cooling system 286, and a desired inlet temperature of the recirculated exhaust gas 66. The extent of the adjustment may correspond to the extent to which the droplet size deviates from the desired droplet size range, as well as the extent that other adjustments in accordance with block 404 can be made.

For example, if little to no heating is being performed in the inlet section 260 (e.g., little to none of the IBH stream 312 is being utilized), then the controller 264 may opt to increase the flow of the IBH stream 312 in addition to increasing cooling medium flow, rather than maximize the flow of cooling medium through the EGR cooling system 286. In performing the adjustment in this way, the controller 264 maintains operational flexibility to enable the exhaust gas moisture control system 262 to better handle transient events in the gas turbine system 150.

The heating adjustment in accordance with block 408 may generally correspond to an adjustment in the operating parameters associated with block 378 in FIG. 7, and may be performed in addition to an adjustment in cooling of the exhaust gas 60 in the exhaust recirculation path 110, or instead of cooling the exhaust gas 60. The extent to which the heating is adjusted may depend on, for example, a maximum dry bulb temperature determined based on the configuration of the compressor section 152 and desired temperature for the compressed exhaust gas utilized as diluent in the combustor section 160 (and/or as an oil extraction medium for use in the EOR system 18 (FIG. 1), the amount of additional cooling available from the EGR cooling system 286 (e.g., whether the flow of the cooling medium can be further increased and by what extent, and/or whether the cooling medium can be reduced in temperature and by what extent), and the measured difference between the wet and dry bulb temperatures determined by the thermometers 270, 272 (FIG. 5). The heating adjustment may also be dependent upon environmental and operational conditions as noted above with respect to the cooling adjustment described with respect to block 406.

The adjustment of the exhaust gas flow parameters according to block 410 may include an adjustment in the amount of recirculated exhaust gas received by the compressor intake 288, which may determine, at least partially, the amount of exhaust gas 60 being cooled by the EGR cooling system 286 and/or the amount of recirculated exhaust gas 66 heated within the inlet section 260. In this way, the cooling and/or heating of the exhaust gas is indirectly controlled. The adjustment in accordance with block 410 may depend on, for example, the amount of exhaust gas appropriate for use within the combustor section 160, the EOR system 18, and the EG supply system 78, as well as the extent of cooling and/or heating adjustments still available to the exhaust gas moisture control system 262. For example, if the controller 264 determines that additional cooling and/or additional heating can still be provided for a given flow rate of the exhaust gas, then the controller 264 may opt to perform adjustments according to blocks 406 and 408 in addition to a smaller adjustment to the exhaust gas flow rate, or instead of any adjustment in accordance with block 410. Adjustments in accordance with block 410 may be performed using any one or a combination of appropriate flow control devices, such as blowers disposed along the exhaust recirculation path 110, a variable choke at the compressor intake 288, using inlet guide vanes of the compressor section 152, or any combination of these and other devices.

The control actions 404 also include providing and/or adjusting the surfactant flow 324 discussed above with respect to FIG. 5 in accordance with block 412. This adjustment may include adjusting a flow rate of the surfactant flow 324 through the inlet section 260, or otherwise adjusting the quantity of surfactant utilized in the surfactant flow 324 (e.g., by causing additional surfactant to be mixed with a diluent to produce the surfactant flow 324) in order to adjust the interactions between the surfactant and the exhaust gas moisture. As noted above, this interaction may result in a reduction of water surface tension, thereby preventing droplet nucleation and growth. The extent of the adjustment in accordance with block 412 may depend on, for example, the level of surfactant already being utilized to control droplet growth, the measured size of the droplets, the relative humidity of the exhaust gas 66 in the inlet section 260, and the availability of additional cooling and/or heating adjustments still available, as described above.

The controller 264 may automatically determine, based on the current state of each of the effectors that control droplet size and growth, as well as the extent of droplet size deviation from the desired range, which of the control actions 404 to adjust. Additionally or alternatively, the controller 264 may cause a user-perceivable indication to be provided to alert a user that a control action may be appropriate in order to return or maintain the droplet size within the desired range, in accordance with block 384 of FIG. 7. The controller 264 may also inform the user as to the control actions 404 that are most preferred based on the current state of the gas turbine system 150, as well as provide indications relating to the estimated health of the compressor components based on operational history of the particular component, as well as based on historical data generated from similar parts used in past embodiments of the system. Indeed, the controller 264 may determine that the compressor component should be changed or undergo maintenance, rather than continue in operation while control actions are performed. For example, as the compressor component becomes older, it may require a greater extent of any one or a combination of control actions 404 to be performed in order to maintain the component in a suitable operating condition. In other words, the amount of cooling and/or heating of the exhaust gas to reduce the moisture condensation to a level that is amenable to further use of an older component may no longer offset the loss associated with equipment maintenance and replacement. In such situations, the controller 264 may provide an indication to the user that the part should be replaced within a prescribed amount of time in order to maintain efficiency.

ADDITIONAL DESCRIPTION

As set forth above, the present embodiments provide systems and methods for suppressing erosion of compressor components in a gas turbine system by controlling exhaust gas (working fluid) moisture parameters. It should be noted that any one or a combination of the features described above may be utilized in any suitable combination. Indeed, all permutations of such combinations are presently contemplated. By way of example, the following clauses are offered as further description of the present disclosure:

Embodiment 1

A gas turbine system, comprising: an exhaust gas compressor, comprising: an inlet section fluidly coupled to a turbine expander via an exhaust gas recirculation path; a detection system comprising at least one non-intrusive measurement device coupled to the inlet section, wherein the at least one non-intrusive measurement device is configured to generate a first feedback relating to moisture contained within an exhaust gas flowing through the inlet section; and a controller communicatively coupled to the detection system and comprising non-transitory media programmed with one or more sets of instructions, and one or more processing devices configured to execute the one or more sets of instructions such that the controller is configured to: evaluate the first feedback for one or more indications of condensation of the moisture within the exhaust gas as the exhaust gas flows through the exhaust gas compressor; and provide a user-perceivable indication for a first corrective action to be taken if the one or more indications are indicative of moisture condensation outside of a first predetermined condensation range; or perform a second corrective action if the one or more indications are indicative of moisture condensation outside of a second predetermined condensation range.

Embodiment 2

The gas turbine system of embodiment 1, comprising an exhaust gas cooler positioned along the exhaust gas recirculation path and coupled to a cooling medium source via a cooling medium flow path, and wherein the controller is communicatively coupled to a cooling medium flow control device to enable the controller to adjust cooling of the exhaust gas within the exhaust recirculation path as all or a part of the first corrective action, the second corrective action, or a combination thereof.

Embodiment 3

The gas turbine system of any preceding embodiment, wherein the exhaust gas compressor comprises a heat exchanger disposed within the inlet section, the heat exchanger being in fluid communication with a heating medium source via a heating medium flow path, and wherein the controller is communicatively coupled to a heating medium flow control device to enable the controller to adjust heating of the exhaust gas within the inlet section as all or a part of the first corrective action, the second corrective action, or a combination thereof.

Embodiment 4

The gas turbine system of any preceding embodiment, wherein the heating medium source is a compression stage or a compressor discharge of the exhaust gas compressor, or both, the heating medium flow path is an inlet bleed heat flow path, the heating medium is compressed exhaust gas, and the heat exchanger is a manifold configured to distribute the compressed exhaust gas within the inlet section.

Embodiment 5

The gas turbine system of any preceding embodiment, wherein the heating medium source is an exhaust gas supply system comprising: an exhaust extraction system configured to extract a heated exhaust gas from a combustor of the gas turbine system; and an exhaust gas compression and dehydration system configured to produce a product gas from the extracted heated exhaust gas, wherein the product gas is the heating medium.

Embodiment 6

The gas turbine system of any preceding embodiment, comprising an electric heating coil disposed within the inlet section of the exhaust gas compressor and configured to heat the exhaust gas within the inlet section, wherein the controller is communicatively coupled to the electric heating coil to enable the controller to adjust heating of the exhaust gas within the inlet section as all or a part of the first corrective action, the second corrective action, or a combination thereof.

Embodiment 7

The gas turbine system of any preceding embodiment, comprising: a cooling system positioned within the exhaust recirculation path and configured to cool exhaust gas within the exhaust recirculation path; and a heating system positioned within the inlet section, wherein the cooling and heating systems are controllably connected to the controller; and wherein the detection system comprises a dewpoint detection system, a dry bulb thermometer, and a water droplet size and flux measurement system, and the controller is configured to modulate the cooling and heating systems based on an evaluation of outputs of any one or a combination of the dewpoint detection system, the dry bulb thermometer, and the water droplet size and flux measurement system.

Embodiment 8

The gas turbine system of any preceding embodiment, wherein the controller is configured to use a transfer function for the respective outputs of the dewpoint detection system, the dry bulb thermometer, and the water droplet size and flux measurement system to derive a projected droplet size and density at an inlet guide vane (IGV) region of the inlet section of the exhaust gas compressor, and the controller is configured to modulate the cooling and heating systems in order to maintain the projected droplet size and density at the inlet guide vane (IGV) region within a predetermined droplet size and density range.

Embodiment 9

The gas turbine system of any preceding embodiment, comprising a surfactant dispersal system configured to inject a surfactant into the exhaust gas within the inlet section of the exhaust gas compressor, wherein the surfactant dispersal system is controllably coupled to the controller, and the controller is configured to modulate injection of the surfactant into the exhaust gas in order to maintain the projected droplet size and density at the inlet guide vane (IGV) region within the predetermined droplet size and density range.

Embodiment 10

The gas turbine system of any preceding embodiment, wherein the evaluation of the outputs is based at least partially on a model relating the projected size and density at the inlet guide vane (IGV) region to compressor airfoil durability.

Embodiment 11

A method according to any preceding embodiment, comprising: flowing an exhaust gas from a turbine of a gas turbine system to an exhaust gas compressor of the gas turbine system via an exhaust recirculation path; evaluating moist flow parameters of the exhaust gas within an inlet section of the exhaust gas compressor using a controller comprising non-transitory media programmed with instructions and one or more processors configured to execute the instructions; and modulating cooling of the exhaust gas within the exhaust recirculation path, heating of the exhaust gas within the inlet section of the exhaust gas compressor, or both, based on the evaluation.

Embodiment 12

The method of any preceding embodiment, wherein evaluating moist flow parameters of the exhaust gas within the inlet section of the exhaust gas compressor comprises: monitoring relative humidity within the inlet section using a wet bulb thermometer and a dry bulb thermometer; monitoring water droplet size and flux using a water droplet size and flux detection system positioned within the inlet section and downstream of the wet and dry bulb thermometers; and monitoring projected droplet size and flux at a portion of the exhaust gas compressor downstream from the water droplet size and flux detection system, the projected droplet size and flux being generated using the relative humidity, the monitored water droplet size and flux, and a transfer function, wherein the cooling and/or heating modulation is made based at least partially on the projected droplet size and flux.

Embodiment 13

The method of any preceding embodiment, wherein modulating cooling of the exhaust gas within the exhaust recirculation path, heating of the exhaust gas within the inlet section of the exhaust gas compressor, or both, based on the evaluation, comprises modulating a flow of inlet bleed heat from a compression stage or a compressor discharge of the exhaust gas compressor and to the inlet section, or modulating a flow of product gas from an exhaust gas supply system to the inlet section, wherein the exhaust gas supply system is configured to extract heated exhaust gas from a turbine combustor of the gas turbine system and to compress and dehydrate the extracted heated exhaust gas to generate the product gas, or a combination thereof.

Embodiment 14

The method of any preceding embodiment, wherein modulating cooling of the exhaust gas within the exhaust recirculation path, heating of the exhaust gas within the inlet section of the exhaust gas compressor, or both, based on the evaluation, comprises modulating a flow of a cooling medium from a cooling medium source to an exhaust gas cooler positioned along the exhaust recirculation path.

Embodiment 15

The method of any preceding embodiment, comprising modulating a flow of surfactant from a surfactant dispersal system configured to inject a surfactant into the exhaust gas within the inlet section of the exhaust gas compressor, and wherein the modulation of the flow of surfactant is configured to maintain the monitored water droplet size and flux within a predetermined monitored water droplet size and flux range.

Embodiment 16

A gas turbine system according to any preceding embodiment, comprising: an exhaust recirculation path extending from a turbine outlet to an exhaust gas compressor; an exhaust gas cooling system positioned along the exhaust recirculation path and configured to cool exhaust gas within the exhaust recirculation path; a water droplet size and flux measurement system positioned downstream of the exhaust gas cooling system and upstream of inlet guide vanes of the exhaust gas compressor, wherein the water droplet size and flux measurement system is configured to measure a droplet size and density of water within the exhaust gas; and a direct contact heating system positioned between the exhaust gas cooling system and the water droplet size and flux measurement system, wherein the direct contact heating system is configured to heat the exhaust gas; a controller communicatively coupled to the water droplet size and flux measurement system, the exhaust gas cooling system, and the direct contact heating system, wherein the controller comprises non-transitory media programmed with instructions that are executable by a processor of the controller such that the controller is configured to monitor the droplet size and/or density of water within the exhaust gas, and modulate cooling of the exhaust gas by the exhaust gas cooling system, modulate heating of the exhaust gas by the direct contact heating system, or both, based at least partially on the monitored droplet size and/or density of water within the exhaust gas.

Embodiment 17

The gas turbine system of any preceding embodiment, wherein the water droplet size and flux measurement system is positioned at an inlet plenum of the exhaust gas compressor or at a bellmouth strut of the exhaust gas compressor.

18. The gas turbine system of any preceding embodiment, wherein the direct contact heating system comprises a manifold disposed within inlet ducting of the exhaust gas compressor and a flow path configured to flow an inlet bleed heat from compressed exhaust gas extracted from a compression stage or a compressor discharge of the exhaust gas compressor to the manifold, wherein the controller is communicatively coupled to a flow control device positioned along the flow path to enable the controller to control the flow of inlet bleed heat into the exhaust gas.

Embodiment 19

The gas turbine system of any preceding embodiment, wherein the direct contact heating system comprises a resistive coil disposed within inlet ducting of the exhaust gas compressor, wherein the resistive coil is communicatively coupled to the controller to enable the controller to modulate heating by the resistive coil.

Embodiment 20

The gas turbine system of any preceding embodiment, comprising a dewpoint temperature measurement system and a dry bulb thermometer positioned between the exhaust cooling system and the water droplet size and flux measurement system, wherein the dewpoint temperature measurement system and the dry bulb thermometer have their respective measurement responses communicatively coupled to the controller, and the controller is configured to use the measurement outputs of the dewpoint temperature measurement system, the dry bulb thermometer, and the water droplet size and flux measurement system, and a transfer function, to derive a projected droplet size and density for water within the exhaust gas at an inlet guide vane plane of the exhaust gas compressor in order to minimize erosion of airfoils of the exhaust gas compressor as a result of moisture condensation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
flowing an exhaust gas from a turbine of a gas turbine system to an exhaust gas compressor of the gas turbine system via an exhaust recirculation path;
evaluating moist flow parameters of the exhaust gas within an inlet section of the exhaust gas compressor using a controller comprising non-transitory media programmed with instructions and one or more processors configured to execute the instructions;
modulating cooling of the exhaust gas within the exhaust recirculation path, heating of the exhaust gas within the inlet section of the exhaust gas compressor, or both, based on the evaluation; and
modulating a flow of surfactant from a surfactant dispersal system configured to inject a surfactant into the exhaust gas within the inlet section of the exhaust gas compressor, and wherein the modulation of the flow of surfactant is configured to maintain a monitored water droplet size and flux within a predetermined monitored water droplet size and flux range.

2. The method of claim 1, wherein the evaluation of the moist flow parameters of the exhaust gas within the inlet section of the exhaust gas compressor comprises estimating a projected droplet size and flux of the exhaust gas at a portion of the exhaust gas compressor based at least in part on the evaluation of the moist flow parameters of the exhaust gas, wherein the cooling modulation of the exhaust gas and/or the heating modulation of the exhaust gas is made based at least partially on the projected droplet size and flux.

3. The method of claim 2, wherein the evaluation of the moist flow parameters of the exhaust gas within the inlet section of the exhaust gas compressor comprises:
monitoring relative humidity within the inlet section using a wet bulb thermometer and a dry bulb thermometer;
monitoring water droplet size and flux using a water droplet size and flux detection system positioned within the inlet section and downstream of the wet and dry bulb thermometers, wherein the portion of the exhaust gas compressor corresponding to the projected droplet size and flux is downstream from the position of the water droplet size and flux detection system; and
monitoring the projected droplet size and flux at the portion of the exhaust gas compressor, the projected droplet size and flux being generated using at least the relative humidity, the monitored water droplet size and flux, and a transfer function, wherein the cooling and/or heating modulation is made based at least partially on the projected droplet size and flux;
wherein the cooling modulation of the exhaust gas and/or the heating modulation of the exhaust gas is configured to maintain the projected droplet size and flux at the portion of the exhaust gas compressor within a respective predetermined monitored water droplet size and flux range.

4. The method of claim 3, wherein the evaluation of the moist flow parameters is based at least partially on a model relating the projected size and flux of water droplets at an inlet guide vane (IGV) region of the inlet section of the exhaust gas compressor to compressor airfoil durability.

5. The method of claim 1, wherein the modulation of the cooling of the exhaust gas within the exhaust recirculation path, the heating of the exhaust gas within the inlet section of the exhaust gas compressor, or both, based on the evaluation, comprises:
modulating a bleed flow of inlet bleed heat from a compression stage or a compressor discharge of the exhaust gas compressor and to the inlet section;
modulating a gas flow of product gas from an exhaust gas supply system to the inlet section, wherein the exhaust gas supply system is configured to extract heated exhaust gas from a turbine combustor of the gas turbine system and to compress and dehydrate the extracted heated exhaust gas to generate the product gas;
controlling power to a resistive heater disposed within the inlet section of the exhaust gas compressor; or
any combination thereof.

6. The method of claim 5, wherein the modulation of the cooling of the exhaust gas within the exhaust recirculation path, the heating of the exhaust gas within the inlet section of the exhaust gas compressor, or both, based on the evaluation, comprises modulating a cooling flow of a cooling medium from a cooling medium source to an exhaust gas cooler positioned along the exhaust recirculation path.

7. The method of claim 1, wherein the modulation of the cooling of the exhaust gas within the exhaust recirculation path, the heating of the exhaust gas within the inlet section of the exhaust gas compressor, or both, based on the evaluation, comprises modulating a cooling flow of a cooling medium from a cooling medium source to an exhaust gas cooler positioned along the exhaust recirculation path.

8. A method, comprising:
flowing an exhaust gas from a turbine of a gas turbine system to an exhaust gas compressor of the gas turbine system via an exhaust recirculation path;
evaluating moist flow parameters of the exhaust gas within an inlet section of the exhaust gas compressor using a controller communicatively coupled to a detection system, wherein the detection system comprises at least one non-intrusive measurement device coupled to the inlet section, the at least one non-intrusive measurement device is configured to generate a first feedback relating to moisture contained within the exhaust gas flowing through the inlet section, the at least one non-intrusive measurement device comprises a water droplet size and flux measurement system, and the moist flow parameters of the exhaust gas are evaluated based at least in part on the first feedback, wherein the controller comprises non-transitory media programmed with instructions and one or more processors configured to execute the instructions; and
modulating cooling of the exhaust gas within the exhaust recirculation path, heating of the exhaust gas within the inlet section of the exhaust gas compressor, or both, based on the evaluation;
wherein evaluating the moist flow parameters of the exhaust gas within the inlet section of the exhaust gas compressor comprises:
monitoring relative humidity within the inlet section using a wet bulb thermometer and a dry bulb thermometer of the detection system;
monitoring water droplet size and flux using the water droplet size and flux detection system of the detection system positioned within the inlet section and downstream of the wet and dry bulb thermometers; and
monitoring projected droplet size and flux at a portion of the exhaust gas compressor downstream from the position of the water droplet size and flux detection system, the projected droplet size and flux being generated using at least the relative humidity, the monitored water droplet size and flux, and a transfer function, wherein the cooling and/or heating modulation is made based at least partially on the projected droplet size and flux.

9. The method of claim 8, wherein the modulation of the cooling of the exhaust gas within the exhaust recirculation path, the heating of the exhaust gas within the inlet section of the exhaust gas compressor, or both, based on the evaluation, comprises:
modulating a bleed flow of inlet bleed heat from a compression stage or a compressor discharge of the exhaust gas compressor and to the inlet section;
modulating a gas flow of product gas from an exhaust gas supply system to the inlet section, wherein the exhaust gas supply system is configured to extract heated exhaust gas from a turbine combustor of the gas turbine system and to compress and dehydrate the extracted heated exhaust gas to generate the product gas; or
any combination thereof.

10. The method of claim 8, wherein the modulation of the cooling of the exhaust gas within the exhaust recirculation path, the heating of the exhaust gas within the inlet section of the exhaust gas compressor, or both, based on the evaluation, comprises modulating a cooling flow of a cooling medium from a cooling medium source to an exhaust gas cooler positioned along the exhaust recirculation path.

11. The method of claim 8, comprising modulating a flow of surfactant from a surfactant dispersal system configured to inject a surfactant into the exhaust gas within the inlet section of the exhaust gas compressor, and wherein the modulation of the flow of surfactant is configured to maintain the monitored water droplet size and flux within a predetermined monitored water droplet size and flux range.

12. The method of claim 8, wherein the modulation of the cooling of the exhaust gas within the exhaust recirculation path, the heating of the exhaust gas within the inlet section of the exhaust gas compressor, or both, based on the evaluation, comprises controlling power to a resistive heater disposed within the inlet section of the exhaust gas compressor.

13. A method, comprising:
flowing an exhaust gas from a turbine of a gas turbine system to an exhaust gas compressor of the gas turbine system via an exhaust recirculation path;
evaluating moist flow parameters of the exhaust gas within an inlet section of the exhaust gas compressor using a controller communicatively coupled to a detection system, wherein the detection system comprises a water droplet size and flux detection system positioned within the inlet section, a wet bulb thermometer, and a dry bulb thermometer, wherein the wet bulb thermometer and the dry bulb thermometer are positioned within the inlet section upstream of the water droplet size and flux detection system, the controller is configured to monitor water droplet size and flux using the water droplet size and flux detection system and the controller is configured to monitor relative humidity of the exhaust gas within the inlet section based on outputs from the wet bulb thermometer and the dry bulb thermometer, and the moist flow parameters of the exhaust gas comprise the monitored water droplet size and flux, wherein the controller comprises non-transitory media programmed with instructions and one or more processors configured to execute the instructions; and
modulating cooling of the exhaust gas within the exhaust recirculation path, heating of the exhaust gas within the inlet section of the exhaust gas compressor, or both, based on the evaluation, wherein the cooling modulation of the exhaust gas and/or the heating modulation of the exhaust gas is configured to maintain the monitored water droplet size and flux within a predetermined monitored water droplet size and flux range.

14. The method of claim 13, wherein the modulation of the cooling of the exhaust gas within the exhaust recirculation path, the heating of the exhaust gas within the inlet section of the exhaust gas compressor, or both, based on the evaluation, comprises:
modulating a cooling flow of a cooling medium from a cooling medium source to an exhaust gas cooler positioned along the exhaust recirculation path; and
modulating a warming flow of a heating medium from a heating medium source to an inlet exhaust gas recirculation (EGR) heating system.

15. The method of claim 14, comprising modulating a flow of surfactant from a surfactant dispersal system configured to inject a surfactant into the exhaust gas within the inlet section of the exhaust gas compressor, and wherein the modulation of the flow of surfactant is configured to maintain the monitored water droplet size and flux within the predetermined monitored water droplet size and flux range.

16. The method of claim 14, wherein the modulation of the warming flow of the heating medium comprises modulating a bleed flow of inlet bleed heat from a compression stage or a compressor discharge of the exhaust gas compressor and to the inlet section.

17. The method of claim 14, wherein the modulation of the warming flow of the heating medium comprises modulating a gas flow of product gas from an exhaust gas supply system to the inlet section, wherein the exhaust gas supply system is configured to extract heated exhaust from a turbine combustor of the gas turbine system and to compress and dehydrate the extracted heated exhaust gas to generate the product gas.

* * * * *